US012642258B2

(12) United States Patent
Donato

(10) Patent No.: US 12,642,258 B2
(45) Date of Patent: Jun. 2, 2026

(54) FLAT LURE

(71) Applicant: Christopher Donato, Kona, HI (US)

(72) Inventor: Christopher Donato, Kona, HI (US)

(73) Assignee: Christopher Donato, Kona, HI (US)

( * ) Notice: Subject to any disclaimer, the term of this patent is extended or adjusted under 35 U.S.C. 154(b) by 0 days.

(21) Appl. No.: 18/827,640

(22) Filed: Sep. 6, 2024

(65) Prior Publication Data

US 2025/0072408 A1      Mar. 6, 2025

Related U.S. Application Data

(60) Provisional application No. 63/580,947, filed on Sep. 6, 2023.

(51) Int. Cl.
A01K 85/14            (2006.01)
(52) U.S. Cl.
CPC .................................. A01K 85/143 (2022.02)
(58) Field of Classification Search
CPC .............................. A01K 85/14; A01K 85/143
See application file for complete search history.

(56) References Cited

U.S. PATENT DOCUMENTS 2,238,900 A  *  4/1941  Hadaway ............... A01K 85/16
                                                              43/44.6
2,791,056 A  *  5/1957  Davis ..................... A01K 85/14
                                                              43/41

4,133,132 A  *  1/1979  Ellis ....................... A01K 85/16
                                                              43/44.4
4,337,591 A  *  7/1982  Gell ....................... A01K 85/16
                                                              43/42.22
4,791,751 A  *  12/1988  Francklyn .............. A01K 83/06
                                                              43/42.49
5,862,623 A  *  1/1999  MacPherson .......... A01K 85/00
                                                              43/42.24
6,154,999 A  *  12/2000  Woods ................... A01K 85/00
                                                              43/42.26
7,497,046 B1 *  3/2009  Jefferson ............... A01K 85/00
                                                              43/44.4
9,044,000 B1 *  6/2015  Lumsden ............... A01K 83/06
2006/0236588 A1 * 10/2006  Rapelje .................. A01K 85/16
                                                              43/42.24
2009/0094879 A1 *  4/2009  Beck ...................... A01K 85/14
                                                              43/42.51
2010/0011651 A1 *  1/2010  Rapelje ................. A01K 85/18
                                                              43/4.5

* cited by examiner

*Primary Examiner* — Christopher P Ellis
(74) *Attorney, Agent, or Firm* — Wang Hardoon, P.C.

(57) ABSTRACT

A lure design with a substantially flat body that mimics the silhouette of fish/prey. The substantially flat body may be attached (or be attachable to) a thicker/three-dimensional "head." Because the body of the lure is substantially flat, the overall weight compared to an equivalently sized (length and width) swimbait is lower. Additionally, since the lure has a thicker head, the motion of the lure through the water may mimic the movement of live prey. The head component may be modular and may be replaced or swapped with a different head component. The disclosed designs may allow for the action of a swimbait style lure but offering a similar weight and size of a teaser with the silhouette of a fish.

21 Claims, 11 Drawing Sheets

FLAT LURE

PRIORITY

This application claims the benefit of priority to U.S. Provisional Patent Application Ser. No. 63/580,947 filed Sep. 6, 2023 and entitled "FLAT LURE", incorporated by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

TECHNICAL FIELD

This disclosure relates generally to the field of fishing devices. More particularly, the present disclosure relates to flat lure designs.

DESCRIPTION OF RELATED TECHNOLOGY

A fishing lure is a type of artificial bait designed to attract and catch fish. Anglers use fishing lures to mimic the appearance and movement of natural prey, such as small fish, insects, or other aquatic creatures, to entice fish to bite the hook. The movement and the action of the lure in the water attracts a fish. When removed from the water, the lure does not necessarily have the appearance of a particular bait/prey; instead, the action of the lure attracts the fish.

Lures come in a wide variety of shapes, sizes, colors, and materials, each intended to imitate a specific type of prey or exploit a certain fishing technique. Marlin fishing, for example, typically involves the use of larger and more specialized lures due to the size and behavior of these powerful and fast-moving fish. Such lures may come in a variety of shapes, sizes, and colors and are aimed at attracting marlin from a distance.

Some marlin lures include skirted trolling lures with a weighted head and skirt made of soft material to resemble squid. Large swimbaits may be used to mimic the appearance and movement of smaller fish.

DETAILED DESCRIPTION

Figure 1:
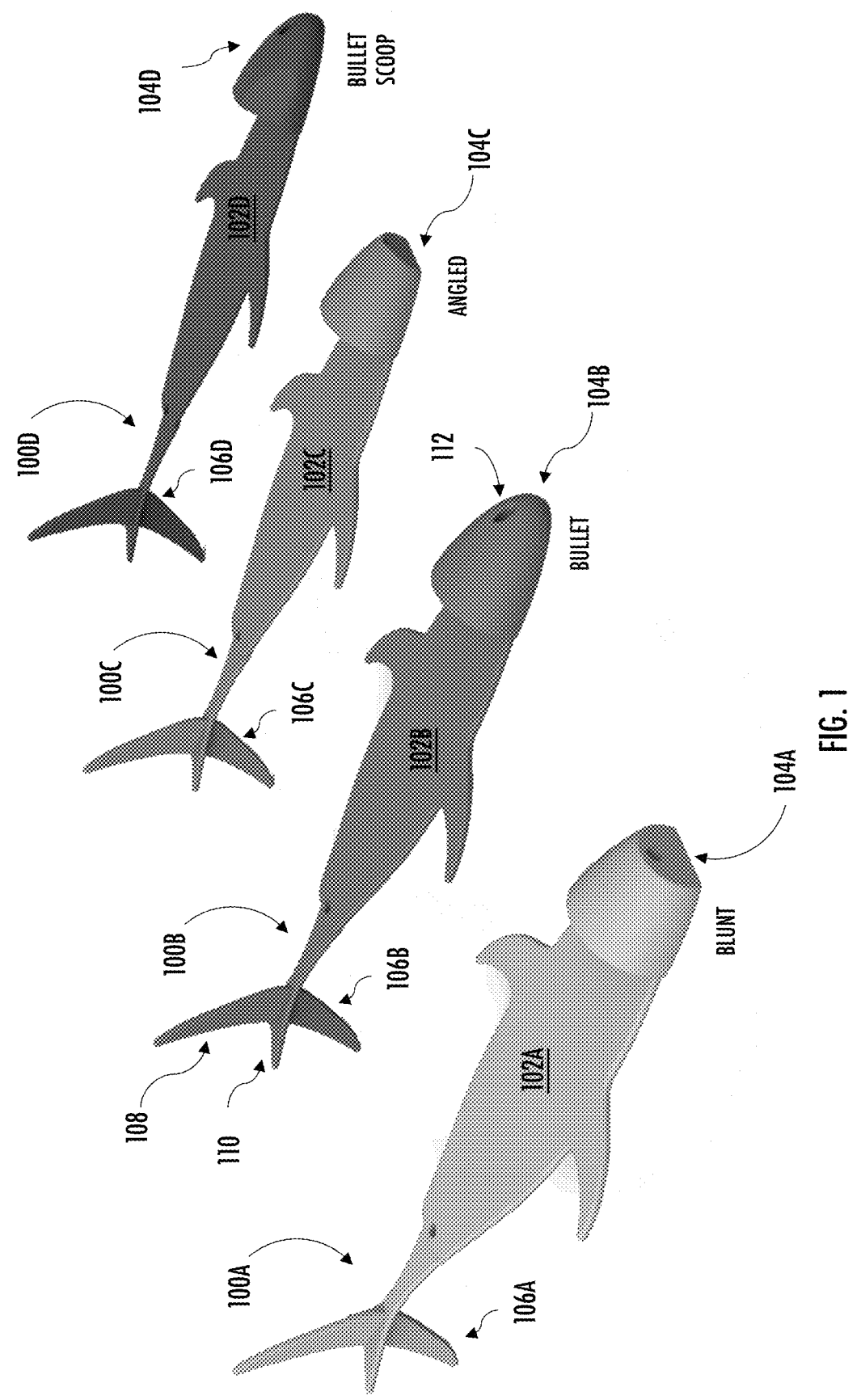
FIG. 1 illustrates exemplary lures according to aspects of the present disclosure.

In the following detailed description, reference is made to the accompanying drawings which form a part hereof wherein like numerals designate like parts throughout, and in which is shown, by way of illustration, embodiments that may be practiced. It is to be understood that other embodiments may be utilized, and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without departing from the spirit or scope of the present disclosure. It should be noted that any discussion herein regarding "one embodiment", "an embodiment", "an exemplary embodiment", and the like indicate that the embodiment described may include a particular feature, structure, or characteristic, and that such particular feature, structure, or characteristic may not necessarily be included in every embodiment. In addition, references to the foregoing do not necessarily comprise a reference to the same embodiment. Finally, irrespective of whether it is explicitly described, one of ordinary skill in the art would readily appreciate that each of the particular features, structures, or characteristics of the given embodiments may be utilized in connection or combination with those of any other embodiment discussed herein.

Example embodiments will now be described more fully with reference to the accompanying drawings. For purposes of the description hereinafter, it is to be understood that the embodiments described below may assume alternative variations and embodiments. It is also to be understood that the specific articles, compositions, and/or processes described herein are exemplary and should not be considered as limiting. In the description, relative terms such as "lower," "upper," "front," "rear," "horizontal," "vertical,", "above," "below," "up," "down," "top," "bottom," and "side" as well as derivatives thereof (e.g., "horizontally,"

"downwardly," "upwardly," etc.) should be construed to refer to the orientation as then described or as shown in the drawing under discussion. The front of the lure or the front of a component of a lure, for example, is the direction toward the head component from the body component of the lure. The rear of the lure or the rear of a component of the lure, for example, is the direction toward the tail section or tail component from the body component of the lure. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

Teaser and Swimbait Lures

Teasers are a type of fishing gear used to attract fish, particularly large game fish like marlin, tuna, and sailfish, to the surface near a fishing boat. Teasers are large, flashy lures or objects that are often trolled ahead of main lures. Teasers are lures or attractors that may be strategically deployed ahead of main fishing lures or bait to create a visual and sometimes auditory disturbance in the water. Teasers create a visual disturbance in the water, attracting marlin or other fish, and bringing the fish closer to the boat. A purpose of using teasers is to stimulate the curiosity and predatory instincts of fish, drawing them closer to the boat and increasing the likelihood of a successful catch. In some examples, teasers are flat with a silhouette shaped like a fish (e.g., tuna or a large strip bait) and can attract fish by the shadow given off by the teaser. Due to their flat shape, these teasers are sometimes referred to as "mud flaps." Unfortunately, these teasers are often just a flat piece of rubber and do not move through the water, when dragged by a boat, like a fish that its silhouette mimics.

Swimbaits are a type of fishing lure designed to imitate the appearance and movement of real live prey. These lures are known for their lifelike and realistic designs, making them highly effective for enticing various game fish. Swimbaits may be made of soft plastic or hard plastic materials. Soft plastic swimbaits often have flexible bodies and natural-looking details, including scales, fins, and eyes. Hard plastic swimbaits may have joints or segmented bodies that create a more realistic swimming action. Due to the three-dimensional nature of the swimbaits (compared with relatively flat teasers), as the dimensions (length and width) increase, the weight and thickness increases. This increases the costs to manufacture, store, and can make the swimbait unwieldy to use. Accordingly, at an equivalent weight, swimbaits are smaller than teasers and thus would be able to mimic the size of larger prey (e.g., tuna). Additionally, due to their shape/dimensions, a large bulky replica may actually pose challenges to actually hooking the fish. For example, a full replica may have more bulk and components in the way which may pose difficulty in attaching a hook to the lure. Additionally, such bulk may also impede the hook from attaching to the fish when the fish attacks the lure as the fish cannot get their mouth around the lure.

Example Operation

According to aspects of the present disclosure, a lure design with a substantially flat body that mimics the silhouette of fish/prey is disclosed. The substantially flat body may be attached (or be attachable to) a thicker/three-dimensional "head." The head segment may be weighted. In some examples, the body may also be attached to a thicker, weighted tail segment. Because the body of the lure is substantially flat, the overall weight compared to an equivalently sized (length and width) swimbait is lower. Additionally, since the lure has a thicker head, the motion of the lure through the water may mimic the movement of live prey or other beneficial properties (depending on the shape of the head).

In some aspects, the head component may be modular and may be replaced or swapped with a different head. This may allow for a single lure to be customized for the situation (e.g., type of fish, boat, weather conditions) and mimic different styles of movement.

The disclosed designs may allow for the action of a swimbait style lure but offering a similar weight and size of a teaser with the silhouette of a fish. The disclosed designs may also be easier and less expensive to manufacture and store than a full replica fish and may be easier to handle than a full replica for an angler. Due to the flat body design, a hook may be attached more easily to the various disclosed designs compared with a fish-replica swimbait. Additionally, the hook may attach more easily to a biting fish as there is less bulk in the way compared to larger swimbaits.

FIG. 1 illustrates exemplary lures 100A-D according to aspects of the present disclosure. The exemplary lures 100A-D may include a body component 102A-D and one of a variety of head components 104A-D attached to the body component 102A-D. Some exemplary lures 100A-D include a tail segment 106A-D. The tail segment 106A-D may include top fins 108 and side fins 110. In other exemplary embodiments, the lure does not include a separate tail component. In such embodiments, the tail component is part of the body component 102A-D.

Four different head component designs are illustrated, however, as would be appreciated with those of ordinary skill other designs may be used with equal success. The head component may be shaped in various ways, each with its own unique movement through the water. The movement of a lure head component may play a role in attracting fish by simulating the appearance and behavior of natural prey. Different lure head shapes and actions are suited for specific fishing conditions and target species. Each of the exemplary head components 104A-D are configured to move differently in the water.

Exemplary lure 100A has a blunt head component 104A. The blunt head component 104A has a flat face (cut at 90 degrees) and is configured to push water forward. The flat face may generate a side-to-side swimming or wobbling motion of the exemplary lure 100A.

Exemplary lure 100B has a bullet-shaped head component 104B. The bullet-shaped head component 104B is shaped in a streamlined, torpedo-like, conical shape resembling a bullet. The bullet-shaped head component 104B may be configured for use in fast trolling or high-speed retrieves. A pointed nose of the bullet-shaped head component 104B may allow the bullet-shaped head component 104B to cut through the water with minimal resistance, creating a straight and stable swimming motion.

Exemplary lure 100C has an angled head component 104C. The angled head component 104C may include a front face at an angle/slant (e.g., cut at a 0-40° angle). The angled face may create a rolling, wobbling, diving and surfacing, or otherwise erratic action as the exemplary lure 100C moves through the water. This action may be effective at attracting larger predatory fish like marlin and sailfish.

Exemplary lure 100D has a bullet-scoop head component 104D. The bullet-scoop head component 104D has a conical shape with concave cutouts at the sides.

Other head component designs may include a cupped- or "chugger"-shaped head component includes a concave face. The concave face may be configured to create a popping or splashing action when pulled through the water as the concave face displaces water and may produce a "chugging" noise.

In some examples, the head component 104 may also include holes or "jets" on the face. These jets may create a trail of bubbles and turbulence as the lure moves through the water. This action can attract fish from a distance due to the combination of movement and bubble trail.

In some examples, the body component 102A-D and the head component 104A-D is bolted together through a tab on the body component 102A-D. The shaft of the bolt may be inserted through a fixing hole in the tab. In some examples, the bolt includes a galvanized steel (or stainless steel) 0.25 in. bolt with a 1 in. shaft and 20 threads per inch (TPI), however other bolt materials, thread counts/pitch, widths, and lengths may be substituted with equal success based on the corresponding holes and threading in the body component 102A-D and the head component 104A-D of the exemplary lure 100A-D.

In other examples, a tab on the body component 102A-D is glued in a nose slot of the head component 104A-D. Alternatively, a tab on the head component 104A-D is glued in a nose slot of the body component 102A-D. In other examples, the body component 102A-D and the head component 104A-D are a single component. For example, the body component 102A-D and the head component 104A-D may be a single injection-molded structure.

The head component 104 forms a rigging cavity 112 that runs the length of the head component 104. The rigging cavity 112 may have a circular (or rounded) cross section configured to pass a fishing line (e.g., a monofilament fishing line). In some examples, the rigging cavity 112 may be reinforced (with, e.g., metal or hard plastic sheathing) throughout its length or at the openings of the head component 104. Reinforcement may reduce wear of the line on the rigging cavity 112 of the exemplary lures 100A-D.

Exemplary lures 100A-D may also include a belly/keel component attached (or attachable) to the body component 102. The belly/keel component may be shaped like a boat hull (e.g., a "v-shape" design) may provide additional stability to the lure (to stop rolling/a helicopter effect) and provide a visual indicator of depth when the lure is viewed from the side (laterally). Weights may be attached to the exemplary lures 100A-D, e.g., to improve the ability of the exemplary lures 100A-D to remain in the water when pulled, e.g., by a boat, at speed.

In preparation for use, a fishing line may be inserted in the rigging cavity 112 of the head component 104. In some examples, the fishing line may be connected to a rod and reel. In other examples, the fishing line may be connected to a dredge. Using a dredge device may allow the lure 100 to be connected or chained with and other lures. In one example, the line may be inserted from the front face of the head component 104 through to towards the body component 102 of the exemplary lure 100. A hook (or multiple hooks) may be installed in numerous manners. In one example, a hook may be installed at the end of the line. In other examples, the hook may be installed in the middle of a line and the line continues past the hook to other hooks lures, or tackle devices. The hook may be installed on the line after the line is inserted through the rigging cavity. The hook may be attached to the body component 102 of the lure 100 via tape or a connector device on or attached to the body component 102 or directly via tape, glue, or similar adhesive. For example, the side of the hook may be pressed against an outer surface (e.g., an upper/top surface) of the body component 102 of the lure 100 to conceal the barb of the hook. The hook may be angled with the hook Once the line has been threaded through the rigging cavity and the hook inserted and attached, the lure 100 is ready for use. In other examples, the hook is not attached to the body component 102 of the lure 100.

During use, the lure 100 may be cast with a conventional rod and reel and pulled with a boat. During operation, the movement of the boat and the tension of the fishing line from the rod may enable the lure 100 to float at or near the surface of the water. The movement of the lure 100 when pulled will vary based on the length of the line, other tackle components on the line, and the type of head component 102 on the lure 100. The action of the lure 100 may provoke a strike from nearby fish.

Figure 2:
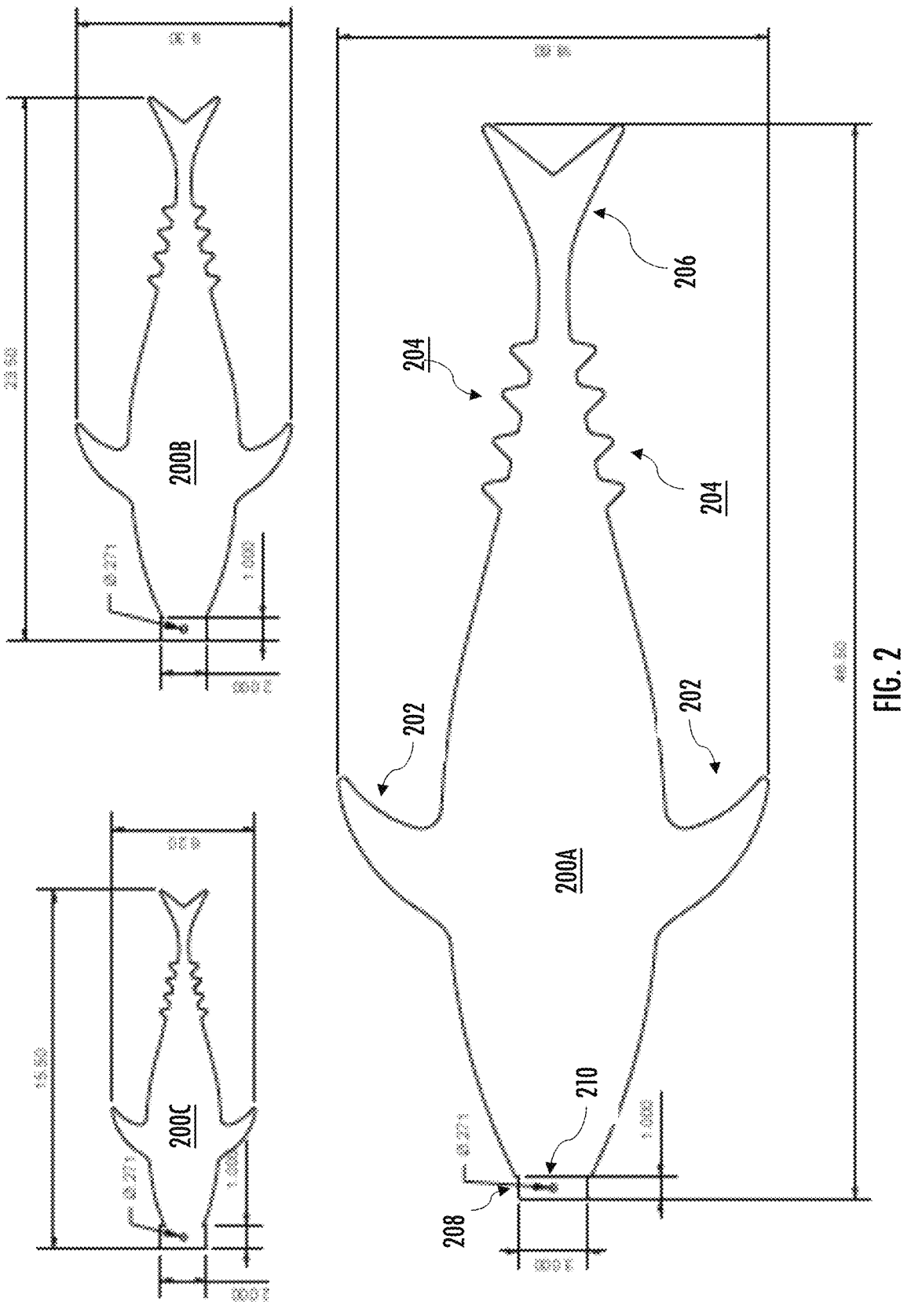
FIG. 2 illustrates exemplary body components of a lure according to aspects of the present disclosure.

FIG. 2 illustrates exemplary body components 200A-C of a lure according to aspects of the present disclosure. A top view of the body components 200A-C is illustrated in FIG. 2. In one example, the body component 200 is constructed from 0.19 in. thick, 50 durometer neoprene rubber. In other examples, other materials and thicknesses (e.g., 0.125 in.) may be used with equal success including neoprene of other strengths, other types of rubber, elastomers, or plastics. The thickness of the body components 200 may vary depending on the strength and flexibility of the material and the desired movement of the body component. In some examples, the body component is formed by cutting a material of substantially uniform thickness. Cutting may be performed with a laser cutter or die.

"Flat" may include a component that has a substantially uniform thickness, is not curved (or without significant curvature), rounded in shape along a particular dimension(s)/side(s). In some examples, flat also means the thickness of the component is less than 0.5 in. In other examples, flat also means the thickness of the component is less than 0.25 in. In further examples, a "flat" body component also means the thickness is less than one-quarter the thickness of a head component. The body component 200 may be substantially flat. For example, the body component may be constructed out of a thin (e.g., 0.19 in.) neoprene material of substantially uniform thickness and does not have curves along its top (shown in FIG. 2) and underside. Additionally, when compared to a head component, the body component is substantially thinner (as illustrated in FIG. 1).

The body component 200 may be shaped to appear like the silhouette of a prey fish. As illustrated, body components 200A-C form the silhouette of a tuna, however the silhouette of other fish may be used with equal success. Accordingly, body component 200 includes fin portions 202 on opposing sides of the body component 200, finlets 204, and a (split) tail 206 at the rear of the body component 200.

Body component 200A may have a tab 208. The tab 208 may be in the front portion of the body component 200. The tab 208 may be configured to be inserted into a nose slot on a head component of a lure and affixed. In some examples, the tab 208 may be affixed with glue. In other examples, the tab 208 may include a fixing hole 210 configured to fit a bolt or other fastener to attach the body component 200 with a head component.

The body component 200A has a length (from tab 208 to tail 206) of 46.50 in. and width (across the fin portions 202) of 18.60 in. The tab 208 of the body component 200A has a width of 3 in. and a length of 1 in. The fixing hole 210 of the body component 200A has a diameter of 0.271 in.

The body component 200B has a length (from tab to tail) of 23.50 in. and width (across the fin portions) of 9.30 in. The tab of the body component 200B has a width of 2 in. and a length of 1 in. The fixing hole of the body component 200B has a diameter of 0.271 in.

The body component 200C has a length (from tab to tail) of 15.50 in. and width (across the fin portions) of 6.20 in. The tab of the body component 200C has a width of 2 in. and a length of 1 in. The fixing hole of the body component 200C has a diameter of 0.271 in.

As would be appreciated by those of ordinary skill other body component lengths, widths, and tab sizes may be used with equal success.

Figure 3:
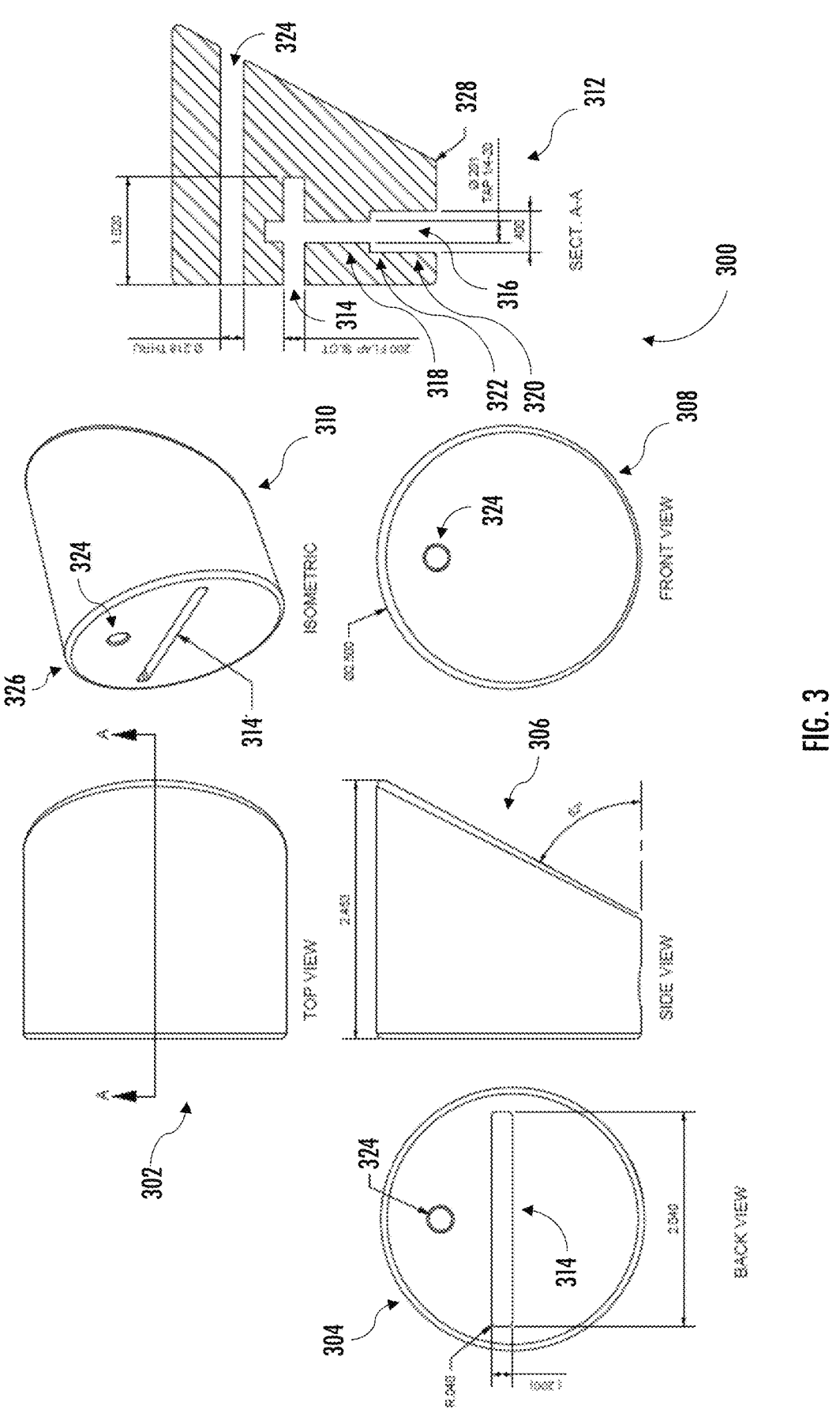
FIG. 3 illustrates multiple views of an exemplary angled head component according to aspects of the present disclosure.

FIG. 3 illustrates multiple views of an exemplary angled head component 300. The multiples views include a top view 302, a rear view 304, a side view 306, a front view 308, an isometric view 310, and a cross-section view 312. The cross-section view 312 may be a cross section of the angled head component 300 at line A, as shown in the top view 302. In some examples, the angled head component 300 is made from a polycarbonate material. In other examples, other materials may be used include metals, e.g., stainless steel, carbon steel, titanium; resins; or plastics.

The angled head component 300 may have a circular/cylindrical shape when viewed from the front (front view 308) or back (rear view 304). In some examples, the diameter of the angled head component 300 is 2.50 in. Other diameter sizes may be used with equal success (as shown, e.g., in FIG. 4). The angled head component 300 may have a first length along its top side. In some examples, the angled head component 300 is 2.453 in. in length along its top side. The angled head component 300 may taper at an angle to a second (smaller) length along the bottom side. In some examples, the angled head component 300 is 1.170 in. in length along its underside. As shown, the external angle of taper is 62° (with an internal taper angle of 28°), however, other angles may be used with equal success to achieve different lure action in the water.

The angled head component 300 may be connected to a body component of the lure via a nose slot 314. A tab on the body component may be inserted into the nose slot 314 and secured with glue or other adhesive. In one example, the nose slot 314 may be 2.04 in. wide, 0.2 in. high, and 1.02 in. deep. In other examples, other dimensions that can accommodate insertion of the tab on the body component may be used with equal success.

A bolt may be inserted into bolt hole 316, and through a fixing hole in the tab of the body component, to secure the body component to the angled head component 300. The bolt hole 316 may cross the nose slot 314 to secure the tab with the bolt. The bolt hole may include portions with different diameters. As shown, the bolt hole 316 may include a first portion 318 with a first diameter to accommodate the shank of a bolt. In some examples, the first diameter may be 0.201 in., however other diameters may be used with equal success to secure the bolt. The first portion 318 may be threaded (or partially threaded) to securely couple to threads on the bolt (with a 0.25 in. tap). A second portion 320 with a second (larger) diameter may accommodate the head of the bolt. In some examples, the second diameter may be 0.4 in., however other diameters may be used with equal success to accommodate the head of the bolt. The head of the bolt may rest on the shoulder 322 between the first portion 318 and the second portion 320 of the bolt hole 316. In some examples, the length of the second portion 320 may be long enough to accommodate the full length of the bolt head. In other examples, the bolt hole 316 has a single diameter to accommodate the shank of the bolt with the head of the bolt resting on the outer surface of the angled head component 300 when installed.

A rigging cavity 324 may run the length of the angled head component 300. The rigging cavity 324 may be configured to accommodate a fishing line to attach the lure to a hook or other tackle devices. As illustrated, the rigging cavity 324 may have a round cross section a diameter of 0.218 in. In other examples, the rigging cavity 324 may be a different shape (e.g., square, hexagonal) and/or different dimensions (larger or smaller diameter).

The angled head component 300 may have a chamfered edge 326. In other examples, the edge may be straight or rounded. Other edges of the angled head component 300 may have straight, rounded, or chamfered edges, e.g., along the outer surface, or around the openings of nose slot 314, rigging cavity 324, and/or bolt hole 316 of the angled head component 300. As illustrated, the edges of the nose slot 314 are rounded (with a radius of 0.04 in.) and edge 328 is rounded (with a radius of 0.06 in.).

Figure 4:
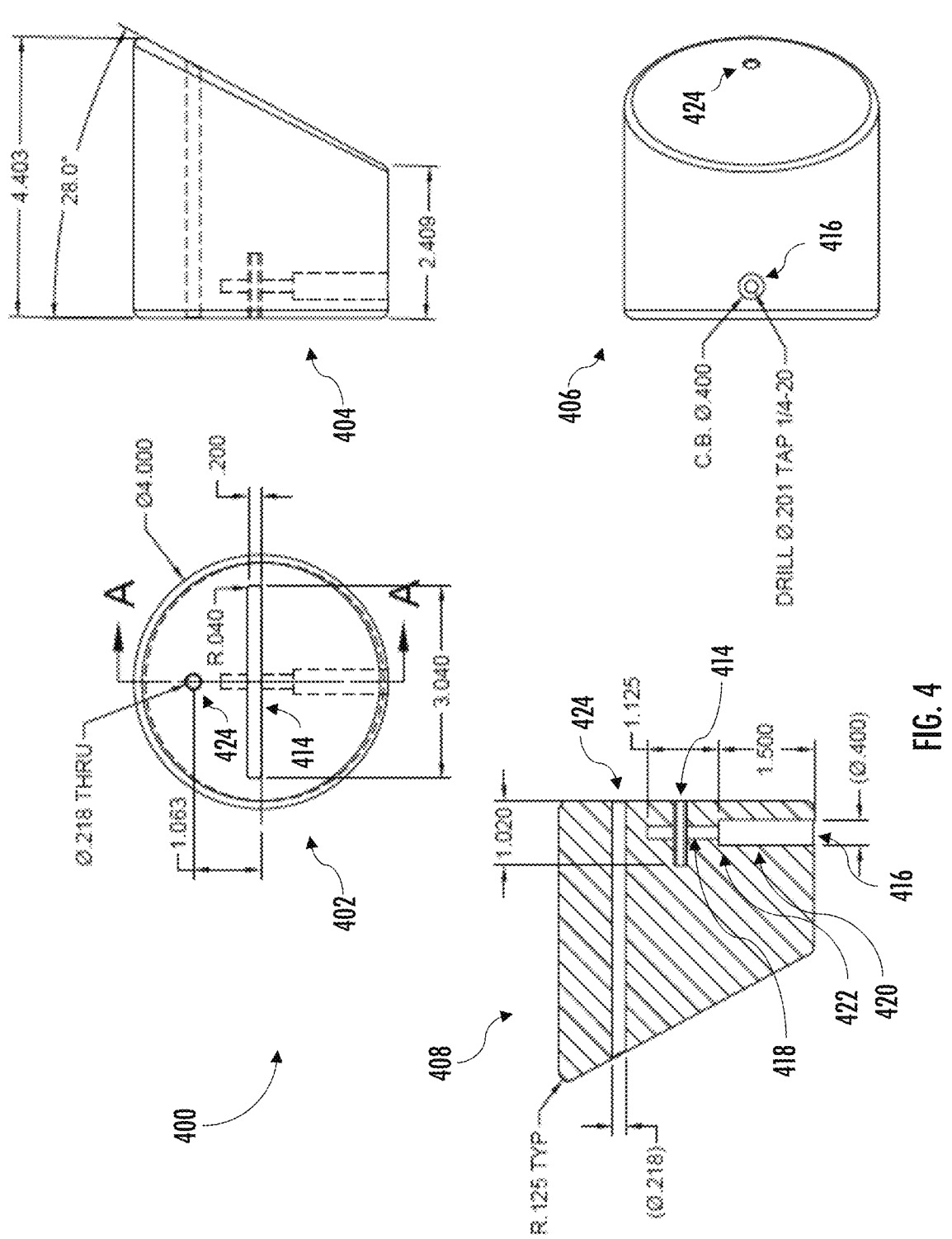
FIG. 4 illustrates multiple views of an exemplary angled head component according to aspects of the present disclosure.

FIG. 4 illustrates multiple views of an exemplary angled head component 400. The multiples views include a rear view 402, a side view 404, an underside view 406, and a cross-section view 408. The cross-section view 408 may be a cross section of the angled head component 400 at line A, as shown in the rear view 402.

Angled head component 400 is similar to the angled head component 300 of FIG. 3 with different dimensions. The angled head component 400 may have a circular/cylindrical shape when viewed from the front or back (rear view 402). In some examples, the diameter of the angled head component 400 is 4.00 in. The angled head component 400 may have a first length along its top side of 4.403 in. that tapers to 2.409 in. at the bottom side. As shown, the angle of taper is 28°. In some examples, the angled head component 300 is 2.453 in. in length. The angled head component 400 may include a rigging cavity 424 connectable to fishing line.

A bolt may be inserted into bolt hole 416, and through a fixing hole in the tab of the body component, to secure the body component to the angled head component 400. The bolt hole 416 may cross the nose slot 414 to secure the tab with the bolt. The bolt hole may include portions with different diameters. As shown, the bolt hole 416 may include a first portion 418 with a first diameter to accommodate the shank of a bolt. In the illustrated example, the length of this first portion may be 1.125 in., however other lengths may be used with equal success to secure the bolt. The first portion 418 may be threaded (or partially threaded) to securely couple to threads on the bolt (with, e.g., a 0.25 in. tap). A second portion 420 with a second (larger) diameter may accommodate the head of the bolt. The length of the second portion 420 may be 1.5 in. In some examples, the second diameter may be 0.4 in., however other diameters may be used with equal success to accommodate the head of the bolt. The head of the bolt may rest on the shoulder 422 between the first portion 418 and the second portion 420 of the bolt hole 416.

Figure 5:
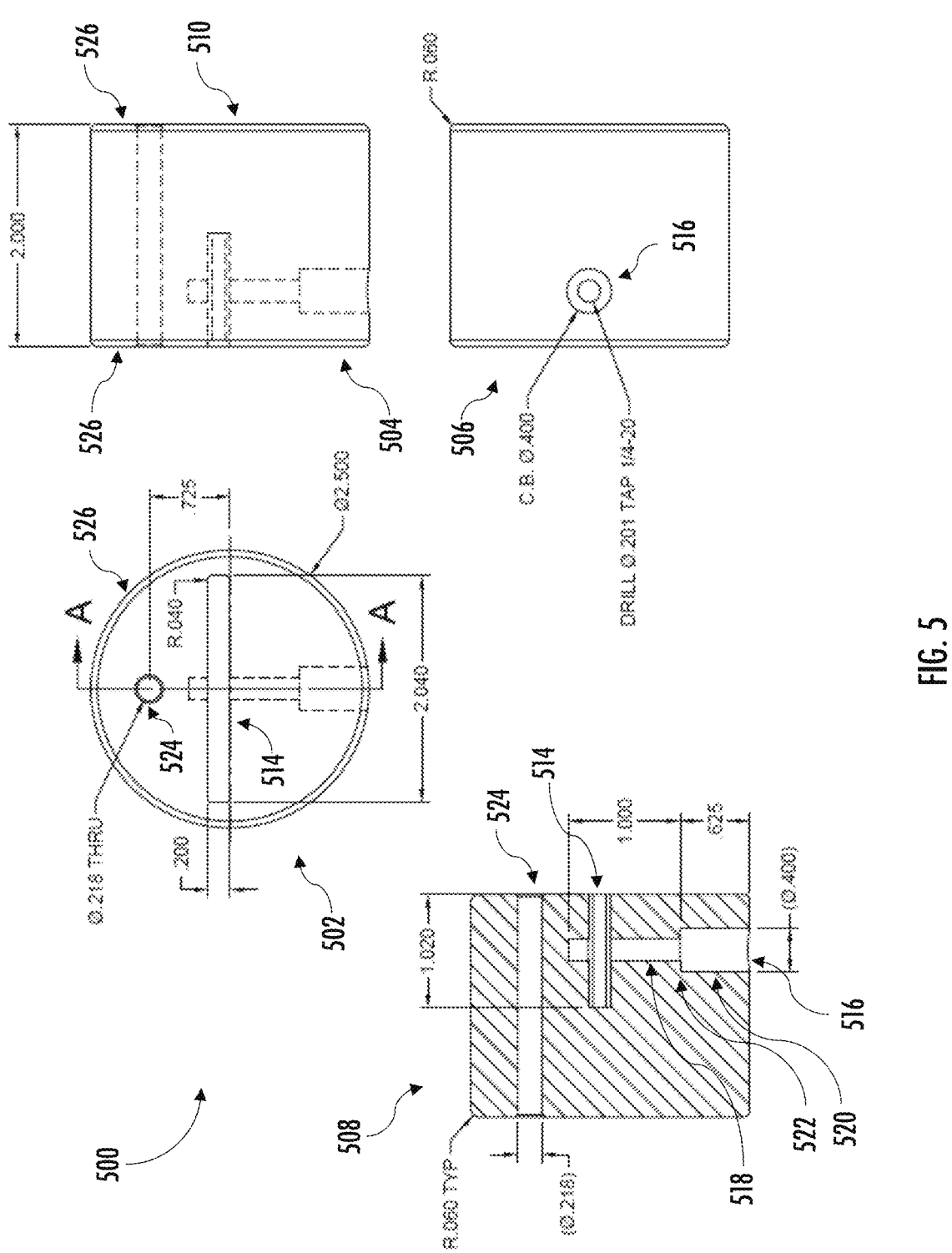
FIG. 5 illustrates multiple views of an exemplary blunt head component according to aspects of the present disclosure.

FIG. 5 illustrates multiple views of an exemplary blunt head component 500. The multiples views include a rear view 502, a side view 504, an underside view 506, and a cross-section view 508. The cross-section view 508 may be a cross section of the blunt head component 500 at line A, as shown in the rear view 502.

The blunt head component 500 may have a circular/cylindrical shape when viewed from the front or back (rear view 502). The blunt head component 500 is characterized by a substantially flat face 510. In some examples, the diameter of the blunt head component 500 is 2.50 in. Other diameter sizes or with other face shapes (e.g., square, hexagonal) may be substituted with equal success. The length of the blunt head component 500 may be 2 in., however, other lengths (larger or smaller) may also be substituted with equal success.

The blunt head component 500 may be connected to a body component of the lure via a nose slot 514. A tab on the body component may be inserted into the nose slot 514 and secured with glue or other adhesive. In one example, the nose slot 514 may be 2.04 in. wide, 0.2 in. high, and 1.02 in. deep. In other examples, other dimensions that can accommodate insertion of the tab on the body component may be used with equal success.

A bolt may be inserted into bolt hole 516, and through a fixing hole in the tab of the body component, to secure the body component to the blunt head component 500. The bolt hole 516 may cross the nose slot 514 to secure the tab with the bolt. The bolt hole may include portions with different diameters. As shown, the bolt hole 516 may include a first portion 518 with a first diameter to accommodate the shank of a bolt. In some examples, the first diameter may be 0.201 in., however other diameters may be substituted with equal success to secure the bolt. The first portion 518 may be threaded (or partially threaded) to securely couple to threads on the bolt (with a 0.25 in. tap). A second portion 520 with a second diameter (larger than the first diameter) configured to accommodate the head of the bolt. In some examples, the second diameter may be 0.4 in. and the length of the second portion may be 0.625 in., however other diameters and lengths may be substituted with equal success to accommodate the head of the bolt. The head of the bolt may rest on the shoulder 522 between the first portion 518 and the second portion 520 of the bolt hole 516. In some examples, the length of the second portion 520 may be long enough to accommodate the full length of the bolt head. In other examples, the bolt hole 516 has a single diameter to accommodate the shank of the bolt with the head of the bolt resting on the outer surface of the blunt head component 500 when installed.

A rigging cavity 524 may run the length of the blunt head component 500. The rigging cavity 524 may be configured to accommodate a fishing line to attach the lure to a hook or other tackle devices. As illustrated, the rigging cavity 524 may have a round cross section with a diameter of 0.218 in. In other examples, the rigging cavity 524 may be a different shape (e.g., square, hexagonal) and/or different dimensions (larger or smaller diameter).

The blunt head component 500 may have rounded edges 526 (with, e.g., a radius of 0.06 in.). In other examples, the edges may be straight or chamfered. Other edges of the blunt head component 500 may have straight, rounded, or chamfered edges, e.g., around the openings of nose slot 514, rigging cavity 524, and/or bolt hole 516 of the blunt head component 500. As illustrated, the edges of the nose slot 514 are rounded (with a radius of 0.04 in.).

Figure 6:
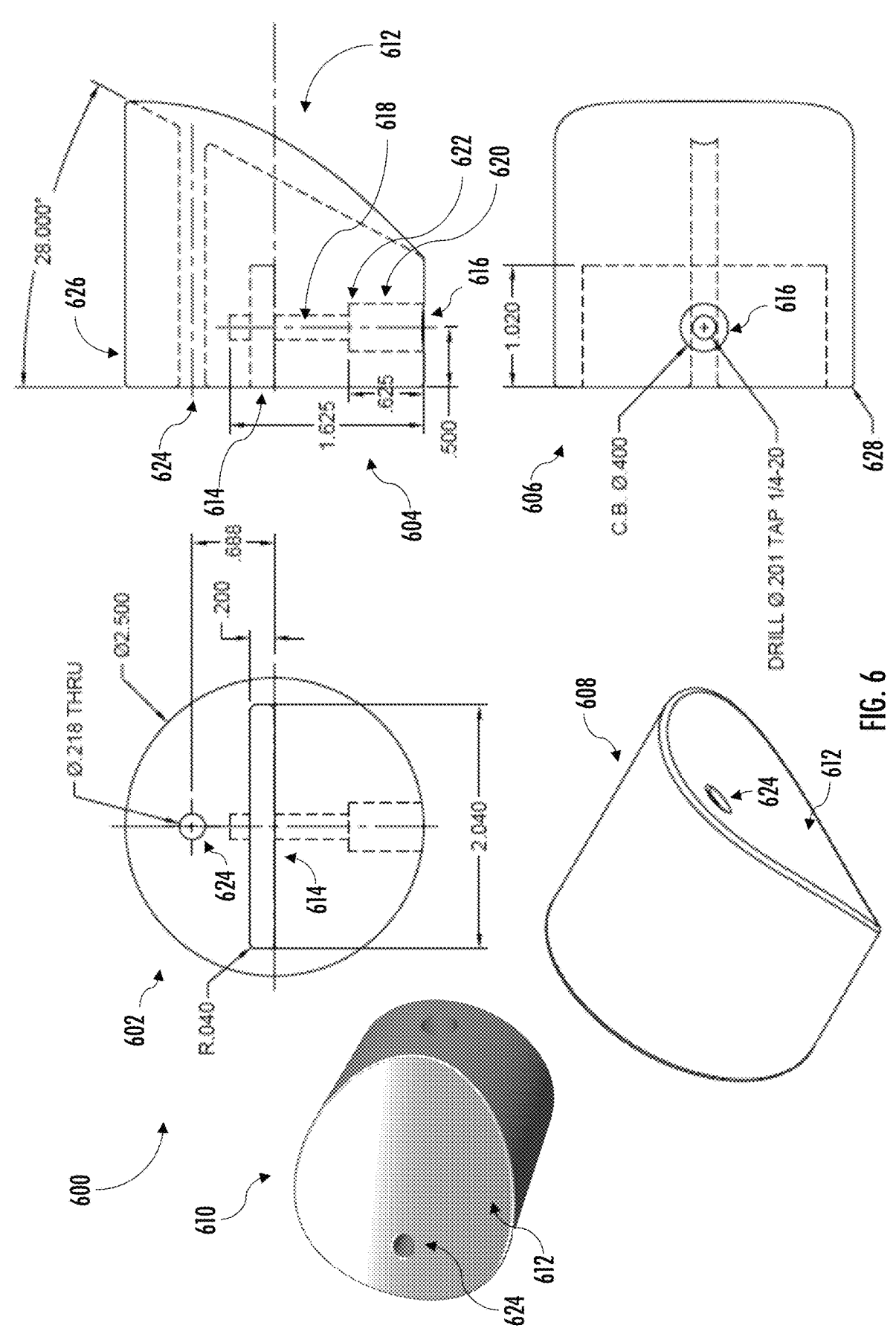
FIG. 6 illustrates multiple views of an exemplary scoop head component according to aspects of the present disclosure.

FIG. 6 illustrates multiple views of an exemplary scoop head component 600. The multiples views include a rear view 602, a side view 604, an underside view 606, an isometric view 608, and a shaded isometric view 610.

The scoop head component 600 may have a circular/cylindrical shape when viewed from the front or back (rear view 602). The scoop head component 600 is characterized by an angled concave face 612. In one example, the concave face 612 is a semi-circular/semi-cylindrical cutout. For example, the semi-circular/semi-cylindrical cutout may have a radius of 2.50 in. Other cutout/face shapes may be used with equal success (but may cause different movement characteristics of the head component and/or lure when in use). For example, the cutout/face shape may be symmetrical (e.g., sine/cosine wave(s), quadratic, square, triangular, etc.) or asymmetrical (e.g., sawtooth, an offset symmetrical shape, etc.) with respect to the lateral sides of the scoop head component. As shown, the angled concave face 612 tapers from a top portion to a bottom portion of the scoop head component 600 at an angle of 28°, however, other angles may be substituted with equal success to achieve different lure action in the water. In some examples, the diameter of the scoop head component 600 is 2.50 in. Other diameter sizes may be substituted with equal success. The length of the scoop head component 600 may be 2.419 in. along the top edge 626 of the scoop head component 600 and may be 1.089 in. along the rounded rear edge 628 of the scoop head component 600, however, other lengths (larger or smaller) may also be substituted with equal success.

The scoop head component 600 may be connected to a body component of the lure via a nose slot 614. A tab on the body component may be inserted into the nose slot 614 and secured with glue or other adhesive. In one example, the nose slot 614 may be 2.04 in. wide, 0.2 in. high, and 1.02 in. deep. In other examples, other dimensions that can accommodate insertion of the tab on the body component may be substituted with equal success.

A bolt may be inserted into bolt hole 616, and through a fixing hole in the tab of the body component, to secure the body component to the scoop head component 600. The bolt hole 616 may cross the nose slot 614 to secure the tab with the bolt. The bolt hole may include portions with different diameters. As shown, the bolt hole 616 may include a first portion 618 with a first diameter to accommodate the shank of a bolt. In some examples, the first diameter may be 0.201 in. and the first portion 618 may have a length of 1 in., however other diameters and lengths may be substituted with equal success to secure the bolt. The first portion 618 may be threaded (or partially threaded) to securely couple to threads on the bolt (with a 0.25 in. tap). A second portion 620 with a second diameter (larger than the first diameter) configured to accommodate the head of the bolt. In some examples, the second diameter may be 0.4 in. and the length of the second portion may be 0.625 in., however other diameters and lengths may be substituted with equal success to accommodate the head of the bolt. The head of the bolt may rest on the shoulder 622 between the first portion 618 and the second portion 620 of the bolt hole 616. In some examples, the length of the second portion 620 may be long enough to accommodate the full length of the bolt head. In other examples, the bolt hole 616 has a single diameter to accommodate the shank of the bolt with the head of the bolt resting on the outer surface of the scoop head component 600 when installed.

A rigging cavity 624 may run the length of the scoop head component 600. The rigging cavity 624 may be configured to accommodate a fishing line to attach the lure to a hook or other tackle devices. As illustrated, the rigging cavity 624 may have a round cross section with a diameter of 0.218 in. In other examples, the rigging cavity 624 may be a different shape (e.g., square, hexagonal) and/or different dimensions (larger or smaller diameter).

The scoop head component 600 may have a rounded rear edge 628 (with, e.g., a radius of 0.04 in.). In other examples, the edges may be straight or chamfered. Other edges of the scoop head component 600 may have straight, rounded, or chamfered edges, e.g., around the openings of nose slot 614, rigging cavity 624, and/or bolt hole 616 of the scoop head component 600. As illustrated, the edges of the nose slot 614 are rounded (with a radius of 0.04 in.).

Figure 7:
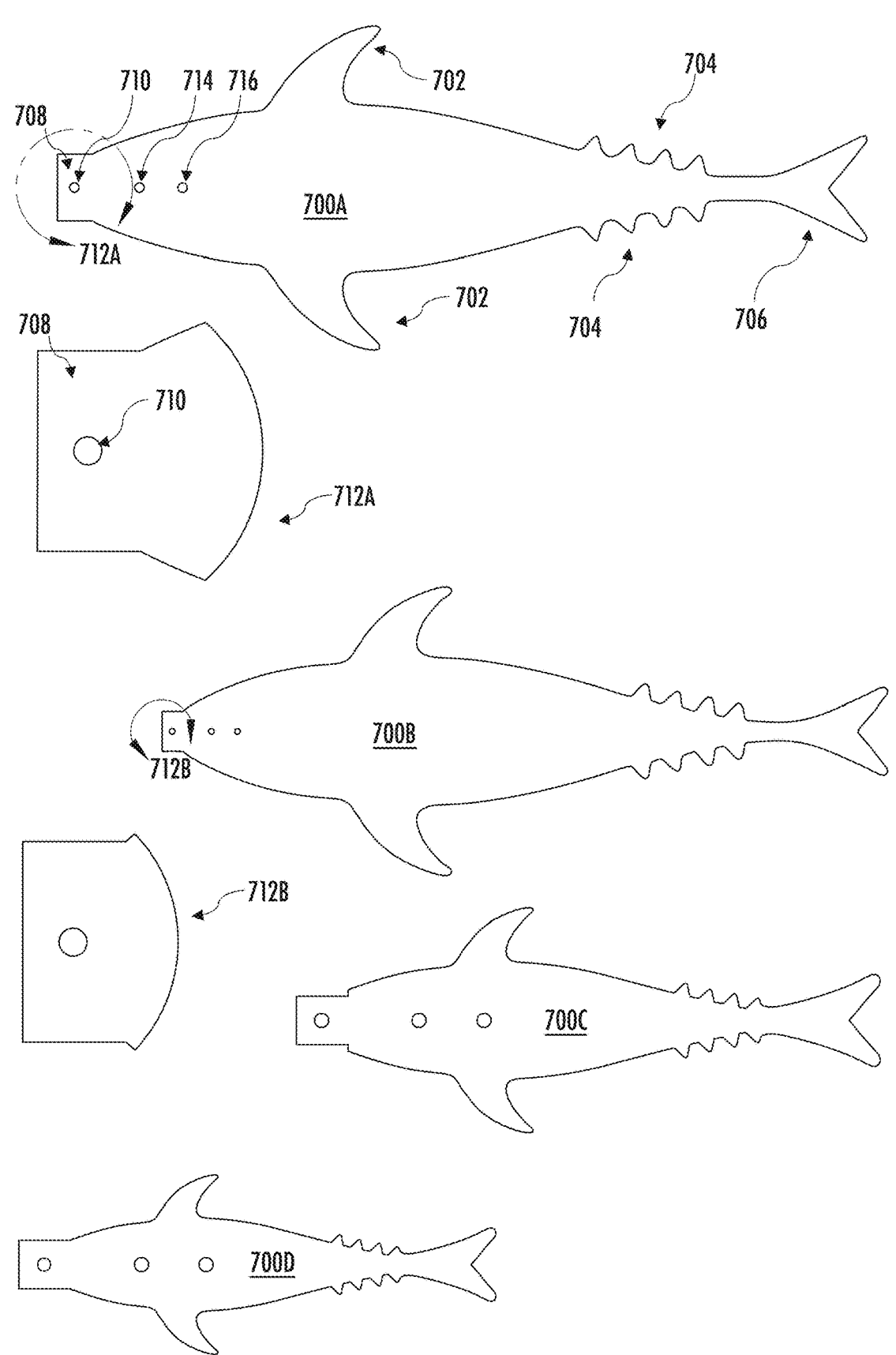
FIG. 7 illustrates exemplary body components of a lure according to aspects of the present disclosure.

FIG. 7 illustrates exemplary body components 700A-D of a lure according to aspects of the present disclosure. A top view of the body components 700A-D is illustrated in FIG. 7. In one example, the body component 700 is constructed from 0.125 in. thick, shore 90 A durometer polyurethane rubber. In other examples, other materials (rubbers, metals, plastics, etc.), hardnesses (e.g., 40 A, 50 A, 60 A, 70 A, 80 A, 100 A, 65 D, etc.) and thicknesses (e.g., 0.125" (⅛"), 0.188" (³⁄₁₆"), 0.25" (¼"), 0.375" (⅜"), 0.5" (½"), 0.625" (⅝"), 0.75" (¾"), 1", 1.5" (1½"), 2", etc.) may be used with equal success including neoprene, other types of rubber, elastomers, or plastics. The thickness of the body components 700 may vary depending on the strength and flexibility of the material and the desired movement of the body component 700A-D. In some examples, the body component 700A-D is formed by cutting a material of substantially uniform thickness. Cutting may be performed with a laser cutter or die.

The body component 700A-D may be shaped to appear like the silhouette of a prey fish. As illustrated, body components 700A-C form the silhouette of a tuna, however the silhouette of other fish may be used with equal success. Accordingly, body component 700 includes fin portions 702 on opposing sides of the body component 700, finlets 704, and a (split) tail 706 at the rear of the body component 700. In some examples, the body component 700 includes a tail slot at the tail end of the body component 700 for the insertion of a tailfin.

Body component 700 may have a tab 708. The tab 708 may be rectangular shaped in the front/head end of the body component 700. The tab 708 may be configured to be inserted into a nose slot on a head component of a lure and affixed. In some examples, the tab 708 may be affixed with an adhesive/bonding agent (e.g., epoxy, glue, acrylic, urethane, etc.). In other examples, the tab 708 may include a fixing hole 710 configured to fit a bolt or other fastener to attach the body component 700 with a head component. A grommet may be inserted into the fixing hole 710. The grommet may be metal (e.g., stainless steel) or other material to protect the body component 700 from tearing.

Body component 700 may include one or more attachment holes 714 and 716. A grommet may be inserted into each of the attachment holes 714 and 716. The grommet may be metal (e.g., stainless steel) or other material to protect the body component 700 from tearing. The attachment holes 714 and 716 may be located towards the front/head end of the body component 700. Attachment holes 714 and 716 may be used to attach one or more weights to the body component 700. Weights may be affixed using bolts, rope, etc. through the attachment holes 714 and 716. In other examples, weights are affixed with clips, snaps, adhesives, etc.

Weights of various sizes/weights may be attached to the body component 700 to alter the depth and/or action/movement of the lure in water, e.g., when trolled by a boat. In some examples, the weight is a 1-pound teardrop-shaped zinc hull anode-type weight. In other examples, the weight may be a 0.4-pound teardrop-shaped zinc hull anode-type weight. In further examples, weights of other weight (0.5 pound, 2 pounds, etc.), material (e.g., metals such as lead, steel, aluminum, magnesium; plastics/resins; etc.), size, and shape (rectangular, round, cylindrical, etc.) may be used with equal success. The weight may have a smooth side and corresponding holes for attachment to the body component 700A-D.

The body component 700A has a length (from tab to tail) of 23.5 in. and width (across the fin portions) of 10.2 in. The tab of the body component 700A has a width of 1 in. and a length of 1 in. The fixing hole of the body component 700A has a diameter of 0.25 in. and is located 0.5 in. from the end of the tab at the center. Cutout view 712A illustrates the tab and the fixing hole of the body component 700A. The affixing holes may have a diameter of 0.25 in. and be located at 2.38 in. and 3.63 in. at the center from the end of the tab to the center of the affixing hole.

The body component 700B has a length (from tab to tail) of 35.07 in. and width (across the fin portions) of 14.4 in. The tab of the body component 700B has a width of 1 in. and a length of 1 in. The fixing hole of the body component 700A has a diameter of 0.25 in. and is located 0.5 in. from the end of the tab at the center. Cutout view 712B illustrates the tab and the fixing hole of the body component 700B. The affixing holes may have a diameter of 0.25 in. and be located at 2.38 in. and 3.63 in. at the center from the end of the tab to the center of the affixing hole.

The body component 700C has a length (from tab to tail) of 11.29 in. and width (across the fin portions) of 4.3 in. The tab of the body component 700C has a width of 1 in. and a length of 1 in. The fixing hole of the body component 700C has a diameter of 0.25 in. and is located 0.5 in. from the end of the tab at the center. The affixing holes may have a diameter of 0.25 in. and be located at 2.38 in. and 3.63 in. at the center from the end of the tab to the center of the affixing hole.

The body component 700D has a length (from tab to tail) of 9 in. and width (across the fin portions) of 3.5 in. The tab of the body component 700D has a width of 1 in. and a length of 1 in. The fixing hole of the body component 700D has a diameter of 0.25 in. and is located 0.5 in. from the end of the tab at the center. The affixing holes may have a diameter of 0.25 in. and be located at 2.38 in. and 3.63 in. at the center from the end of the tab to the center of the affixing hole.

As would be appreciated by those of ordinary skill other body component lengths, widths, and tab sizes may be used with equal success.

Figures 8, 9, 10:
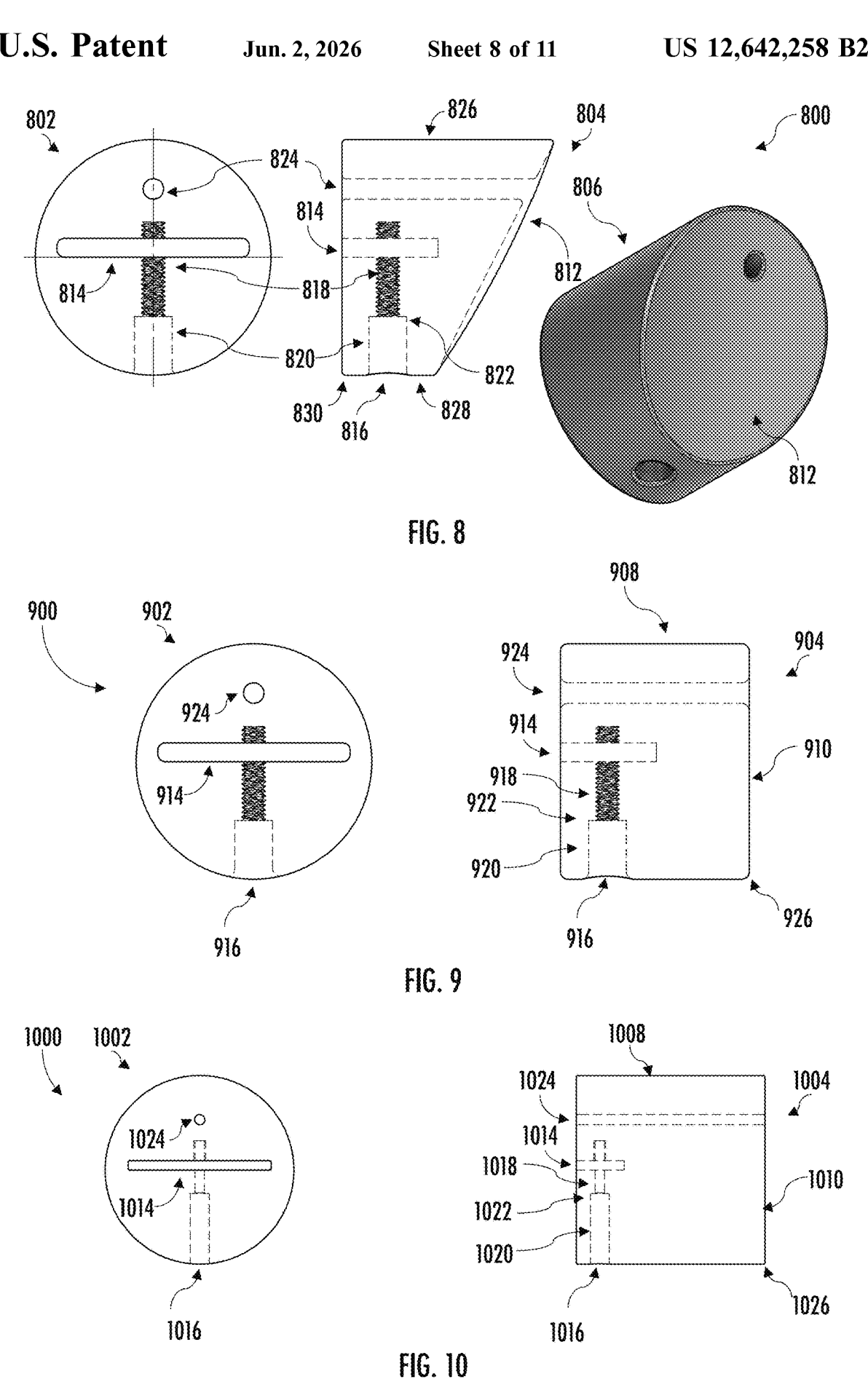
FIG. 8 illustrates multiple views of an exemplary scoop head component according to aspects of the present disclosure.
FIG. 9 illustrates a rear view and a side view of an exemplary blunt head component.
FIG. 10 illustrates a rear view and a side view of an exemplary blunt head component.

FIG. 8 illustrates multiple views of an exemplary scoop head component 800. The multiples views include a rear view 802, a side view 804, and a shaded isometric view 806.

The scoop head component 800 may have a circular/cylindrical shape when viewed from the front or back (rear view 802). The scoop head component 800 is characterized by an angled concave face 812. In one example, the concave face 812 is a semi-circular/semi-cylindrical cutout. For example, the semi-circular/semi-cylindrical cutout may have a radius of 8.5 in. Other cutout/face shapes may be used with equal success (but may cause different movement characteristics of the head component and/or lure when in use). For example, the cutout/face shape may be symmetrical (e.g., sine/cosine wave(s), quadratic, square, triangular, etc.) or asymmetrical (e.g., sawtooth, an offset symmetrical shape, etc.) with respect to the lateral sides of the scoop head component. As shown, the angled concave face 812 tapers from a top edge 826 (with a length of, e.g., 2.24 in.) to a bottom edge 828 (with a length of, e.g., 0.87 in.) of the scoop head component 800 at an angle of 27°, however, other angles and lengths may be substituted with equal success to achieve different lure action in the water. In some examples, the diameter of the scoop head component 800 is 2.50 in. Other diameter sizes may be substituted with equal success.

The scoop head component 800 may be connected to a body component of the lure via a nose slot 814. A tab on the body component may be inserted into the nose slot 814. The tab may be secured with glue or other adhesive. In one example, the nose slot 814 may be 2.04 in. wide, 0.2 in. high, and 1.02 in. deep. In other examples, other dimensions that can accommodate insertion of the tab on the body component may be substituted with equal success.

A bolt may be inserted into bolt hole 816, and through a fixing hole in the tab of the body component, to secure the body component to the scoop head component 800. The center of the bolt hole 816 may be 0.5 in. from the rear (shown in rear view 802) of scoop head component 800. The bolt hole 816 may cross the nose slot 814 to secure the tab with the bolt. The bolt hole may include portions with different diameters. As shown, the bolt hole 816 may include a first portion 818 with a first diameter to accommodate the shank of a bolt. In some examples, the first portion 818 may be threaded (with e.g., 20 threads per inch) and have a major diameter of 0.25 in. and the first portion 818 may have a length of 1 in., however other diameters and lengths may be substituted with equal success to secure the bolt. A second portion 820 with a second diameter (larger than the first diameter) configured to accommodate the head of the bolt. In some examples, the second diameter may be 0.4 in. and the length of the second portion may be 0.625 in., however other diameters and lengths may be substituted with equal success to accommodate the head of the bolt. The head of the bolt may rest on the shoulder 822 between the first portion 818 and the second portion 820 of the bolt hole 816. In some examples, the length of the second portion 820 may be long enough to accommodate the full length of the bolt head. In other examples, the bolt hole 816 has a single diameter to accommodate the shank of the bolt with the head of the bolt resting on the outer surface (e.g., the bottom edge 828) of the scoop head component 800 when installed.

A rigging cavity 824 may run the length of the scoop head component 800. The rigging cavity 824 may be configured to accommodate a fishing line to attach the lure to a hook or other tackle devices. As illustrated, the rigging cavity 824 may have a round cross section with a diameter of 0.22 in. and the center of the rigging cavity 824 is located 0.73 inches from the center of the rear of scoop head component 800. In other examples, the rigging cavity 824 may be a different shape (e.g., square, hexagonal) and/or different dimensions (larger or smaller diameter).

The scoop head component 800 may have a rounded rear lower edge 830 (with, e.g., a radius of 0.04 in.). In other examples, the edges may be straight or chamfered. Other edges of the scoop head component 800 may have straight, rounded, or chamfered edges, e.g., around the openings of nose slot 814, rigging cavity 824, and/or bolt hole 816 of the scoop head component 800. As illustrated, the edges of the nose slot 814 are rounded (with a radius of 0.08 in.).

FIG. 9 illustrates a rear view 902 and a side view 904 of an exemplary blunt head component 900.

The blunt head component 900 may have a circular/cylindrical shape when viewed from the front or back (rear view 902). The blunt head component 900 is characterized by a substantially flat face 910. In some examples, the diameter of the blunt head component 900 is 2.50 in. Other diameter sizes or with other face shapes (e.g., square, hexagonal) may be substituted with equal success. The length of the blunt head component 900 may be 2 in., along a top side 908 and a bottom side, however, other lengths (larger or smaller) may also be substituted with equal success.

The blunt head component 900 may be connected to a body component of the lure via a nose slot 914. A tab on the body component may be inserted into the nose slot 914 and secured with glue or other adhesive. In one example, the nose slot 914 may be 2.04 in. wide, 0.2 in. high, and 1.02 in. deep. In other examples, other dimensions that can accommodate insertion of the tab on the body component may be used with equal success.

A bolt may be inserted into bolt hole 916, and through a fixing hole in the tab of the body component, to secure the body component to the blunt head component 900. The bolt hole 916 may cross the nose slot 914 to secure the tab with the bolt. The bolt hole may include portions with different diameters. As shown, the bolt hole 916 may include a first portion 918 with a first diameter to accommodate the shank of a bolt. In some examples, the first portion 918 may be threaded (with a major diameter of 0.25 in), or partially threaded, to securely couple to threads on the bolt however other diameters may be substituted with equal success to secure the bolt. A second portion 920 with a second diameter (larger than the first diameter) configured to accommodate the head of the bolt. In some examples, the second diameter may be 0.4 in. and the length of the second portion may be 0.63 in., however other diameters and lengths may be substituted with equal success to accommodate the head of the bolt. The head of the bolt may rest on the shoulder 922 between the first portion 918 and the second portion 920 of the bolt hole 916. In some examples, the length of the second portion 920 may be long enough to accommodate the full length of the bolt head. In other examples, the bolt hole 916 has a single diameter to accommodate the shank of the bolt with the head of the bolt resting on the outer surface of the blunt head component 900 when installed.

A rigging cavity 924 may run the length of the blunt head component 900. The rigging cavity 924 may be configured to accommodate a fishing line to attach the lure to a hook or other tackle devices. As illustrated, the rigging cavity 924 may have a round cross section with a diameter of 0.22 in. In other examples, the rigging cavity 924 may be a different shape (e.g., square, hexagonal) and/or different dimensions (larger or smaller diameter).

The blunt head component 900 may have rounded edges 926. In other examples, the edges may be straight or chamfered. Other edges of the blunt head component 900 may have straight, rounded, or chamfered edges, e.g., around the openings of nose slot 914, rigging cavity 924, and/or bolt hole 916 of the blunt head component 900. As illustrated, the edges of the nose slot 914 are rounded (with a radius of 0.08 in.).

FIG. 10 illustrates a rear view 1002 and a side view 1004 of an exemplary blunt head component 1000.

The blunt head component 1000 may have a circular/cylindrical shape when viewed from the front or back (rear view 1002). The blunt head component 1000 is characterized by a substantially flat face 1010. In some examples, the diameter of the blunt head component 1000 is 4 in. Other diameter sizes or with other face shapes (e.g., square, hexagonal) may be substituted with equal success. The length of the blunt head component 1000 may be 4 in., along a top side 1008 and a bottom side, however, other lengths (larger or smaller) may also be substituted with equal success.

The blunt head component 1000 may be connected to a body component of the lure via a nose slot 1014. A tab on the body component may be inserted into the nose slot 1014 and secured with glue or other adhesive. In one example, the nose slot 1014 may be 1.1 in. wide, 0.2 in. high, and 1.02 in. deep. In other examples, other dimensions that can accommodate insertion of the tab on the body component may be used with equal success.

A bolt may be inserted into bolt hole 1016, and through a fixing hole in the tab of the body component, to secure the body component to the blunt head component 1000. The bolt hole 1016 may cross the nose slot 1014 to secure the tab with the bolt. The bolt hole may include portions with different diameters. As shown, the bolt hole 1016 may include a first portion 1018 with a first diameter to accommodate the shank of a bolt. In some examples, the first portion 1018 may be threaded (with a major diameter of 0.25 in), or partially threaded, to securely couple to threads on the bolt however other diameters may be substituted with equal success to secure the bolt. A second portion 1020 with a second diameter (larger than the first diameter) configured to accommodate the head of the bolt. In some examples, the second diameter may be 0.4 in. and the length of the second portion may be 0.63 in., however other diameters and lengths may be substituted with equal success to accommodate the head of the bolt. The head of the bolt may rest on the shoulder 1022 between the first portion 1018 and the second portion 1020 of the bolt hole 1016. In some examples, the length of the second portion 1020 may be long enough to accommodate the full length of the bolt head. In other examples, the bolt hole 1016 has a single diameter to accommodate the shank of the bolt with the head of the bolt resting on the outer surface of the blunt head component 1000 when installed.

A rigging cavity 1024 may run the length of the blunt head component 1000. The rigging cavity 1024 may be configured to accommodate a fishing line to attach the lure to a hook or other tackle devices. As illustrated, the rigging cavity 1024 may have a round cross section with a diameter of 0.22 in. In other examples, the rigging cavity 1024 may be a different shape (e.g., square, hexagonal) and/or different dimensions (larger or smaller diameter).

The blunt head component 1000 may have rounded edges 1026. In other examples, the edges may be straight or chamfered. Other edges of the blunt head component 1000 may have straight, rounded, or chamfered edges, e.g., around the openings of nose slot 1014, rigging cavity 1024, and/or bolt hole 1016 of the blunt head component 1000. As illustrated, the edges of the nose slot 1014 are rounded (with a radius of 0.08 in.).

Figure 11:
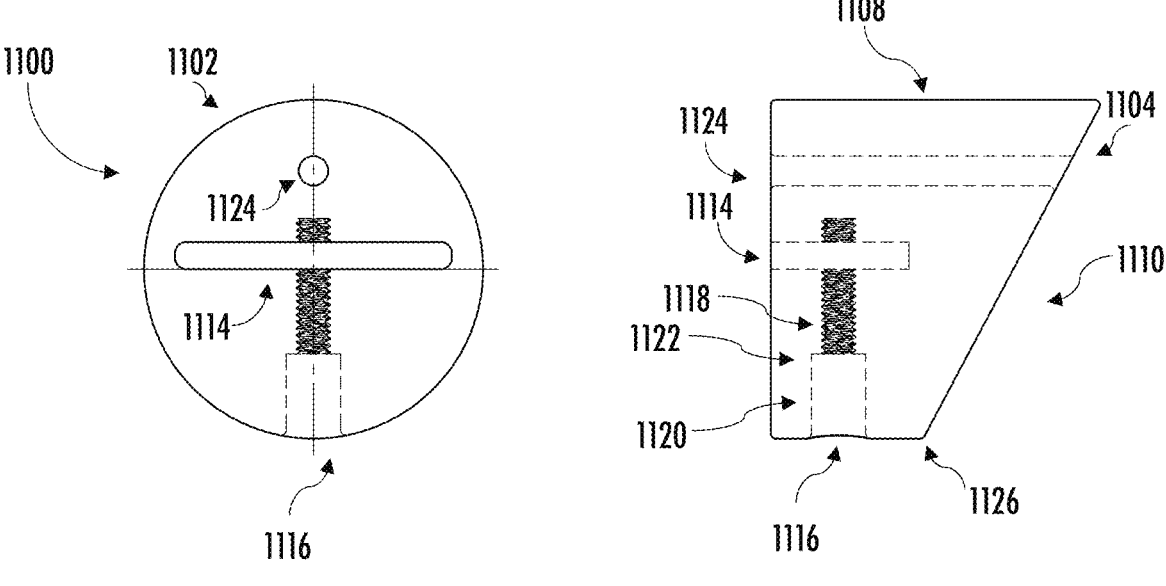
FIG. 11 illustrates a rear view and a side view of an exemplary hard cut head component according to aspects of the present disclosure.

FIG. 11 illustrates a rear view 1102 and a side view 1104 of an exemplary hard cut head component 1100.

The hard cut head component 1100 may have a circular/cylindrical shape when viewed from the front or back (rear view 1102). In some examples, the diameter of the hard cut head component 1100 is 2.50 in. Other diameter sizes may be used with equal success. The hard cut head component 1100 may have a first length along its top side 1108. In some examples, the hard cut head component 1100 is 2.42 in. in length along its top side 1108. The hard cut head component 1100 may taper, at the front face 1110, at an angle to a second (smaller) length along the bottom side. In some examples, the hard cut head component 1100 is 1.170 in. in length along its underside. As shown, the external angle of taper is 118° (with an internal taper angle of) 28°, however, other angles may be used with equal success to achieve different lure action in the water.

The hard cut head component 1100 may be connected to a body component of the lure via a nose slot 1114. A tab on the body component may be inserted into the nose slot 1114 and secured with glue or other adhesive. In one example, the nose slot 1114 may be 2.04 in. wide, 0.2 in. high, and 1.02 in. deep. In other examples, other dimensions that can accommodate insertion of the tab on the body component may be used with equal success.

A bolt may be inserted into bolt hole 1116, and through a fixing hole in the tab of the body component, to secure the body component to the hard cut head component 1100. The bolt hole 1116 may cross the nose slot 1114 to secure the tab with the bolt. The bolt hole may include portions with different diameters. As shown, the bolt hole 1116 may include a first portion 1118 with a first diameter to accommodate the shank of a bolt. In some examples, the first diameter may be 0.25 in., however other diameters may be used with equal success to secure the bolt. The first portion 1118 may be threaded (or partially threaded) to securely couple to threads (¼-20 UNC) on the bolt. A second portion 1120 with a second (larger) diameter may accommodate the head of the bolt. In some examples, the second diameter may be 0.4 in., however other diameters may be used with equal success to accommodate the head of the bolt. The head of the bolt may rest on the shoulder 1122 between the first portion 1118 and the second portion 1120 of the bolt hole 1116. In some examples, the length of the second portion 1120 may be long enough to accommodate the full length of the bolt head. In other examples, the bolt hole 1116 has a single diameter to accommodate the shank of the bolt with the head of the bolt resting on the outer surface of the hard cut head component 1100 when installed.

A rigging cavity 1124 may run the length of the hard cut head component 1100. The rigging cavity 1124 may be configured to accommodate a fishing line to attach the lure to a hook or other tackle devices. As illustrated, the rigging cavity 1124 may have a round cross section a diameter of 0.22 in. In other examples, the rigging cavity 1124 may be a different shape (e.g., square, hexagonal) and/or different dimensions (larger or smaller diameter).

The hard cut head component 1100 may have a rounded edge 1126. In other examples, the edge may be straight or chamfered. Other edges of the hard cut head component 1100 may have straight, rounded, or chamfered edges, e.g., along the outer surface, or around the openings of nose slot 1114, rigging cavity 1124, and/or bolt hole 1116 of the hard cut head component 1100. The edges of the nose slot 1114 may be rounded.

Figure 12:
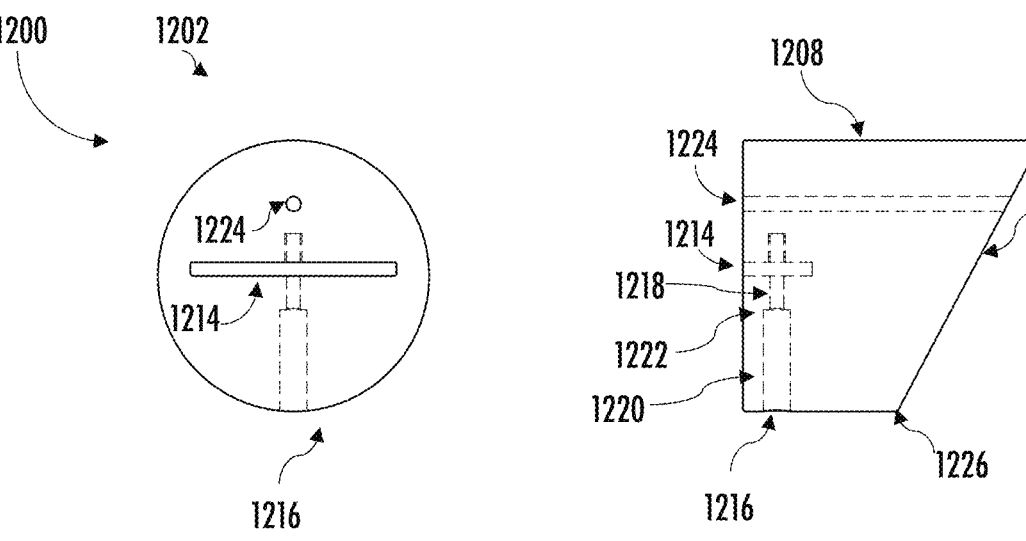
FIG. 12 illustrates a rear view and a side view of an exemplary hard cut head component according to aspects of the present disclosure.

FIG. 12 illustrates a rear view 1202 and a side view 1204 of an exemplary hard cut head component 1200.

The hard cut head component 1200 may have a circular/cylindrical shape when viewed from the front or back (rear view 1202). In some examples, the diameter of the hard cut head component 1200 is 4 in. Other diameter sizes may be used with equal success. The hard cut head component 1200 may have a first length along its top side 1208. In some examples, the hard cut head component 1200 is 2.42 in. in length along its top side 1208. The hard cut head component 1200 may taper, at the front face 1210, at an angle to a second (smaller) length along the bottom side. For example, the external angle of taper may be 128 (with an internal taper angle of 28°), however, other angles may be used with equal success to achieve different lure action in the water.

The hard cut head component 1200 may be connected to a body component of the lure via a nose slot 1214. A tab on the body component may be inserted into the nose slot 1214 and secured with glue or other adhesive. In one example, the nose slot 1214 may be 2.04 in. wide, 0.2 in. high, and 1.02 in. deep. In other examples, other dimensions that can accommodate insertion of the tab on the body component may be used with equal success.

A bolt may be inserted into bolt hole 1216, and through a fixing hole in the tab of the body component, to secure the body component to the hard cut head component 1200. The bolt hole 1216 may cross the nose slot 1214 to secure the tab with the bolt. The bolt hole may include portions with different diameters. As shown, the bolt hole 1216 may include a first portion 1218 with a first diameter to accommodate the shank of a bolt. In some examples, the first diameter may be 0.25 in., however other diameters may be used with equal success to secure the bolt. The first portion 1218 may be threaded (or partially threaded) to securely couple to threads (¼-20 UNC) on the bolt. A second portion 1220 with a second (larger) diameter may accommodate the head of the bolt. In some examples, the second diameter may be 0.4 in., however other diameters may be used with equal success to accommodate the head of the bolt. The head of the bolt may rest on the shoulder 1222 between the first portion 1218 and the second portion 1220 of the bolt hole 1216. In some examples, the length of the second portion 1220 may be long enough to accommodate the full length of the bolt head. In other examples, the bolt hole 1216 has a single diameter to accommodate the shank of the bolt with the head of the bolt resting on the outer surface of the hard cut head component 1200 when installed.

A rigging cavity 1224 may run the length of the hard cut head component 1200. The rigging cavity 1224 may be configured to accommodate a fishing line to attach the lure to a hook or other tackle devices. As illustrated, the rigging cavity 1224 may have a round cross section a diameter of 0.22 in. In other examples, the rigging cavity 1224 may be a different shape (e.g., square, hexagonal) and/or different dimensions (larger or smaller diameter).

The hard cut head component 1200 may have a rounded edge 1226. In other examples, the edge may be straight or chamfered. Other edges of the hard cut head component 1200 may have straight, rounded, or chamfered edges, e.g., along the outer surface, or around the openings of nose slot 1214, rigging cavity 1224, and/or bolt hole 1216 of the hard cut head component 1200. The edges of the nose slot 1214 may be rounded.

Figure 13:
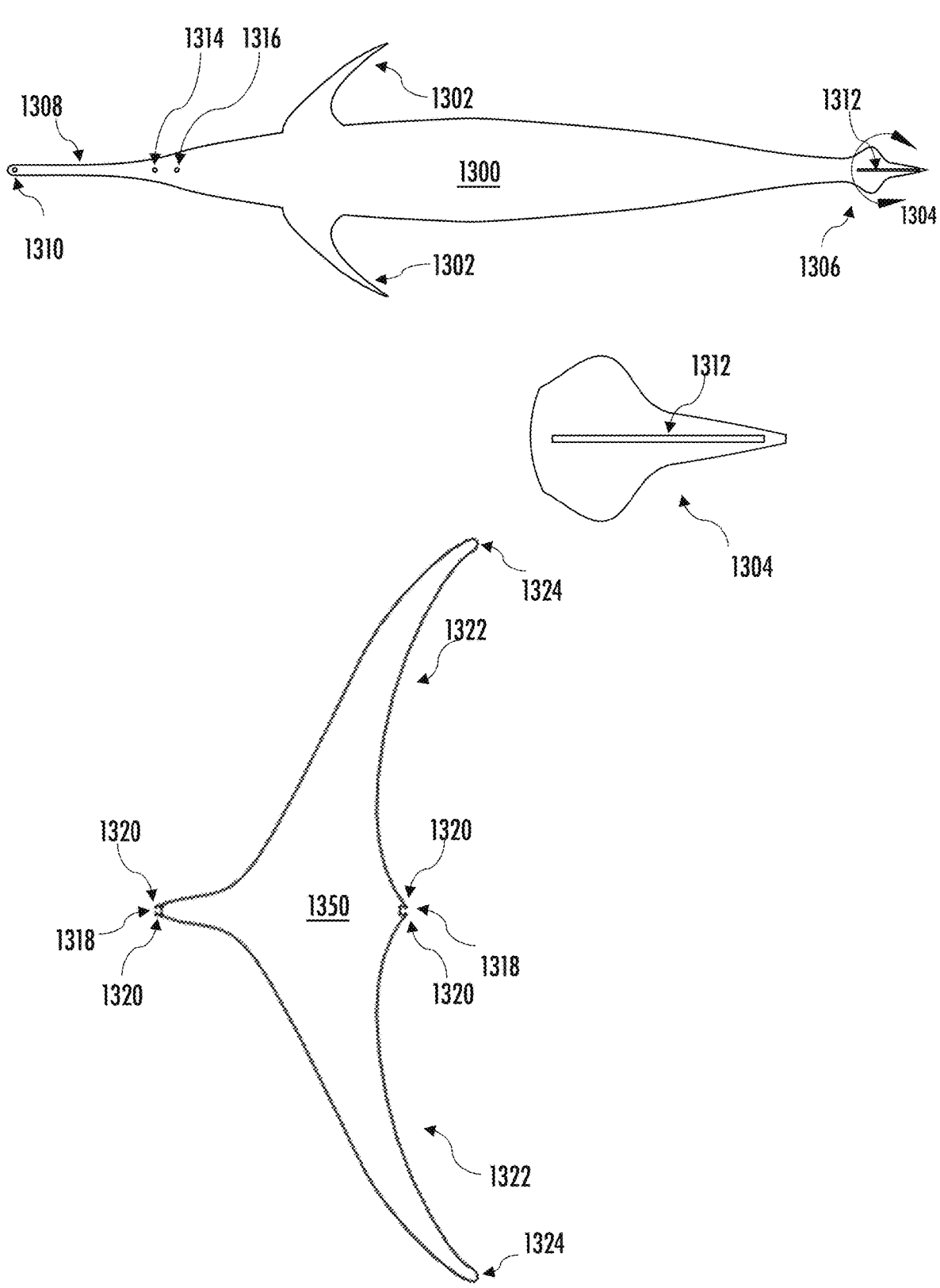
FIG. 13 illustrates a top view of a body component and a side view of a tailfin of an exemplary lure according to aspects of the present disclosure.

FIG. 13 illustrates a top view of a body component 1300 and a side view of a tailfin 1350 of an exemplary lure according to aspects of the present disclosure. In one example, the body component 1300 and the tailfin 1350 are constructed from 0.125 in. thick, shore 90 A durometer polyurethane rubber. In other examples, other materials (rubbers, metals, plastics, etc.), hardnesses (e.g., 40 A, 50 A, 60 A, 70 A, 80 A, 100 A, 65 D, etc.) and thicknesses (e.g., 0.125" (⅛"), 0.188" (³⁄₁₆"), 0.25" (¼"), 0.375" (⅜"), 0.5" (½"), 0.625" (⅝"), 0.75" (¾"), 1", 1.5" (1½"), 2", etc.) may be used with equal success including neoprene, other types of rubber, elastomers, or plastics. The thickness of the body component 1300 and/or tailfin 1350 may vary depending on the strength and flexibility of the material and the desired movement of the body component 1300 and/or tailfin 1350. In some examples, the body component 1300 and/or tailfin 1350 is formed by cutting a material of substantially uniform thickness. Cutting may be performed with a laser cutter or die.

The body component 1300 may be shaped to appear like the silhouette of a bill fish. As illustrated, body component 1300 forms the silhouette of a marlin, however the silhouette of other fish may be used with equal success. Accordingly, the body component 1300 includes fin portions 1302 on opposing sides of the body component 1300, and a tail end 1306 at the rear of the body component 1300. The body component 1300 includes a tail slot 1312 at the tail end 1306 of the body component 1300 for the insertion of a tailfin 1350.

Body component 1300 may taper to a bill 1308. The bill 1308 may have a curved terminus and located in the front/head end of the body component 1300. The bill 1308 may be configured to be inserted into a nose slot on a head component of a lure and affixed. In some examples, the bill 1308 may be affixed with an adhesive/bonding agent (e.g., epoxy, glue, acrylic, urethane, etc.). In other examples, the bill 1308 may include a fixing hole 1310 configured to fit a bolt or other fastener to attach the body component 1300 with a head component. A grommet may be inserted into the fixing hole 1310. The grommet may be metal (e.g., stainless steel) or other material to protect the body component 1300 from tearing.

Body component 1300 may include one or more attachment holes 1314 and 1316. A grommet may be inserted into each of the attachment holes 1314 and 1316. The grommet may be metal (e.g., stainless steel) or other material to protect the body component 1300 from tearing. The attachment holes 1314 and 1316 may be located towards the front/head end of the body component 1300. Attachment holes 1314 and 1316 may be used to attach one or more weights to the body component 1300. A weight may be attached to the body component 1300 to alter the depth and/or action/movement of the lure in water, e.g., when trolled by a boat. Weights may be affixed using bolts, rope, etc. through the attachment holes 1314 and 1316. In other examples, weights are affixed with clips, snaps, adhesives, etc.

The body component 1300 has a length (from bill 1308 to tail end 1306) of 62.47 in. and width (across the fin portions) of 17.21 in. The fixing hole 1310 of the body component 1300 has a diameter of 0.25 in. and is located 0.5 in. from the end of the bill 1308 at the center. The affixing holes 1314 and 1316 may have a diameter of 0.25 in. and be located at 10 in. and 11.5 in. at the center from the end of the bill 1308 to the center of the affixing hole 1314 and 1316.

Cutout view 1304 illustrates the tail end 1306 of the body component 1300. Tail slot 1312 may be 4 in. in length and 0.125 inches wide (matching the thickness of the tailfin 1350) and located 57.72 in. from the end of the bill 1308 at the center.

Tailfin 1350 may be couplable to the body component 1300. Tailfin 1350 has a lunate/crescent shape. Other tailfin shapes (e.g., round, forked, indented, square/truncate, pointed, etc.) may be used with equal success. The tailfin 1350 may alter the action of and provide additional stability for the lure. Tailfin 1350 may fit within the tail slot 1312, in the center of the tailfin 1350, at the tailfin grooves 1318 on either side of the tailfin 1350 between retaining sides 1320 on either side of the tailfin grooves 1318. The tailfin 1350 may be held in place by friction or may be secured with adhesive or other attachment mechanism. The tailfin 1350 may have two lobes 1322 on either side of the grooves 1318, each of the lobes 1322 ending with a lobe tip 1324.

The tailfin 1350 may have a width (between lobe tips 1324) of 12.45 in. and a length between the grooves 1318 of 4 in. (matching the length of the tail slot 1312).

As would be appreciated by those of ordinary skill other body component and tailfin lengths, widths, and thicknesses, and slot sizes may be used with equal success.

Figure 14:
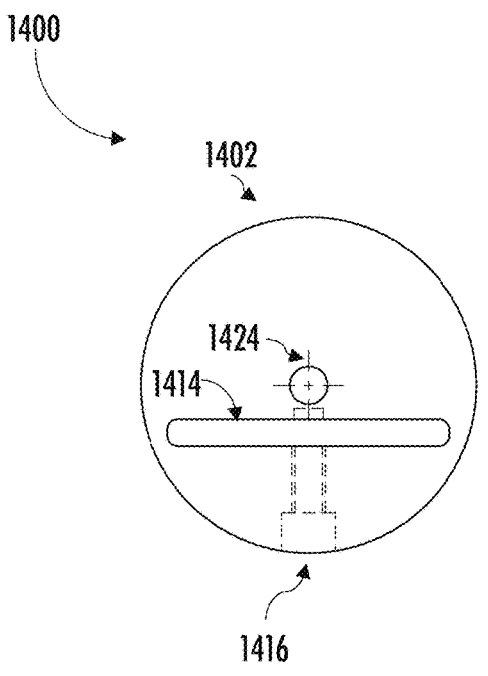
FIG. 14 illustrates a rear view and a side view of an exemplary blunt head component according to aspects of the present disclosure.
Figure 14:
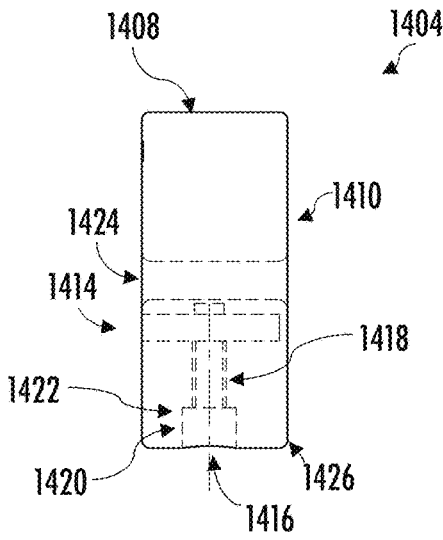

FIG. 14 illustrates a rear view 1402 and a side view 1404 of an exemplary blunt head component 1400.

The blunt head component 1400 may have a circular/cylindrical shape when viewed from the front or back (rear view 1402). The blunt head component 1400 is characterized by a substantially flat face 1410. In some examples, the diameter of the blunt head component 1400 is 2.5 in. Other diameter sizes or with other face shapes (e.g., square, hexagonal) may be substituted with equal success. The length of the blunt head component 1400 may be 1.08 in., along a top side 1408 and a bottom side, however, other lengths (larger or smaller) may also be substituted with equal success.

The blunt head component 1400 may be connected to a body component (e.g., body component 1300) of the lure via a nose slot 1414. A bill on the body component may be inserted into the nose slot 1414 and secured with glue or other adhesive. In one example, the nose slot 1414 may be 2.1 in. wide, 0.2 in. high, and 1.02 in. deep. In other examples, other dimensions that can accommodate insertion of the bill on the body component may be used with equal success.

A bolt may be inserted into bolt hole 1416, and through a fixing hole in the bill of the body component, to secure the body component to the blunt head component 1400. The bolt hole 1416 may cross the nose slot 1414 to secure the bill with the bolt. The bolt hole may include portions with different diameters. As shown, the bolt hole 1416 may include a first portion 1418 with a first diameter to accommodate the shank of a bolt. In some examples, the first portion 1418 may have a length (e.g., 0.78 in.) and be threaded (with a ¼-20 UNC/major diameter of 0.25 in), or partially threaded, to securely couple to threads on the bolt however other diameters may be substituted with equal success to secure the bolt. A second portion 1420 with a second diameter (larger than the first diameter) configured to accommodate the head of the bolt. In some examples, the second diameter may be 0.4 in. and the length of the second portion may be 0.28 in., however other diameters and lengths may be substituted with equal success to accommodate the head of the bolt. The head of the bolt may rest on the shoulder 1422 between the first portion 1418 and the second portion 1420 of the bolt hole 1416. In some examples, the length of the second portion 1420 may be long enough to accommodate the full length of the bolt head. In other examples, the bolt hole 1416 has a single diameter to accommodate the shank of the bolt with the head of the bolt resting on the outer surface of the blunt head component 1400 when installed.

A rigging cavity 1424 may run the length of the blunt head component 1400. The rigging cavity 1424 may be configured to accommodate a fishing line to attach the lure to a hook or other tackle devices. As illustrated, the rigging cavity 1424 may have a round cross section with a diameter of 0.26 in. In other examples, the rigging cavity 1424 may be a different shape (e.g., square, hexagonal) and/or different dimensions (larger or smaller diameter).

The blunt head component 1400 may have rounded edges 1426. In other examples, the edges may be straight or chamfered. Other edges of the blunt head component 1400 may have straight, rounded, or chamfered edges, e.g., around the openings of nose slot 1414, rigging cavity 1424, and/or bolt hole 1416 of the blunt head component 1400. As illustrated, the edges of the nose slot 1414 are rounded (with a radius of 0.08 in.).

Figure 15:
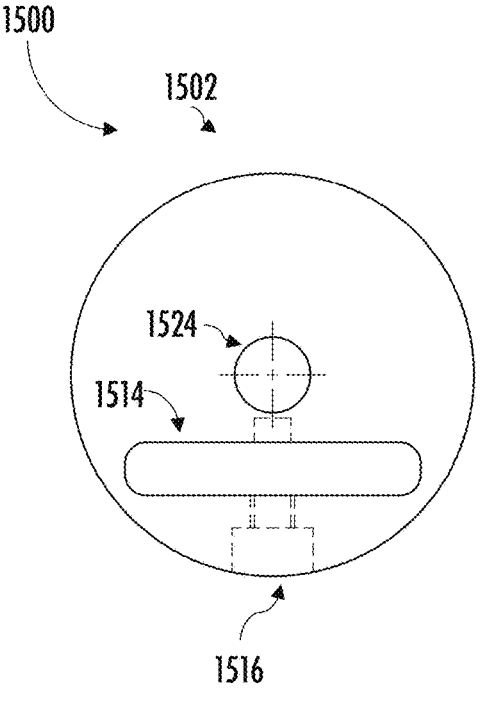
FIG. 15 illustrates a rear view and a side view of an exemplary blunt head component according to aspects of the present disclosure.
Figure 15:
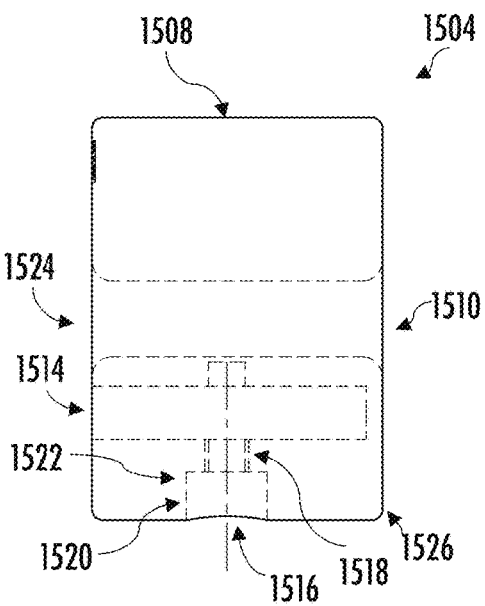

FIG. 15 illustrates a rear view 1502 and a side view 1504 of an exemplary blunt head component 1500.

The blunt head component 1500 may have a circular/cylindrical shape when viewed from the front or back (rear view 1502). The blunt head component 1500 is characterized by a substantially flat face 1510. In some examples, the diameter of the blunt head component 1500 is 1.5 in. Other diameter sizes or with other face shapes (e.g., square, hexagonal) may be substituted with equal success. The length of the blunt head component 1500 may be 1.08 in., along a top side 1508 and a bottom side, however, other lengths (larger or smaller) may also be substituted with equal success.

The blunt head component 1500 may be connected to a body component (e.g., body component 1300) of the lure via a nose slot 1514. A bill on the body component may be inserted into the nose slot 1514 and secured with glue or other adhesive. In one example, the nose slot 1514 may be 1.1 in. wide, 0.2 in. high, and 1.02 in. deep. In other examples, other dimensions that can accommodate insertion of the bill on the body component may be used with equal success.

A bolt may be inserted into bolt hole 1516, and through a fixing hole in the bill of the body component, to secure the body component to the blunt head component 1500. The bolt hole 1516 may cross the nose slot 1514 to secure the bill with the bolt. The bolt hole may include portions with different diameters. As shown, the bolt hole 1516 may include a first portion 1518 with a first diameter to accommodate the shank of a bolt. In some examples, the first portion 1518 may have a length (e.g., 0.41 in.) and be threaded (with a 8-32 UNC/major diameter of 0.164 in), or partially threaded, to securely couple to threads on the bolt however other diameters may be substituted with equal success to secure the bolt. A second portion 1520 with a second diameter (larger than the first diameter) configured to accommodate the head of the bolt. In some examples, the second diameter may be 0.3 in. and the length of the second portion may be 0.16 in., however other diameters and lengths may be substituted with equal success to accommodate the head of the bolt. The head of the bolt may rest on the shoulder 1522 between the first portion 1518 and the second portion 1520 of the bolt hole 1516. In some examples, the length of the second portion 1520 may be long enough to accommodate the full length of the bolt head. In other examples, the bolt hole 1516 has a single diameter to accommodate the shank of the bolt with the head of the bolt resting on the outer surface of the blunt head component 1500 when installed.

A rigging cavity 1524 may run the length of the blunt head component 1500. The rigging cavity 1524 may be configured to accommodate a fishing line to attach the lure to a hook or other tackle devices. As illustrated, the rigging cavity 1524 may have a round cross section with a diameter of 0.22 in. In other examples, the rigging cavity 1524 may be a different shape (e.g., square, hexagonal) and/or different dimensions (larger or smaller diameter).

The blunt head component 1500 may have rounded edges 1526. In other examples, the edges may be straight or chamfered. Other edges of the blunt head component 1500 may have straight, rounded, or chamfered edges, e.g., around the openings of nose slot 1514, rigging cavity 1524, and/or bolt hole 1516 of the blunt head component 1500. As illustrated, the edges of the nose slot 1514 are rounded (with a radius of 0.08 in.).

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. A fishing lure comprising:
a body component comprising a front portion and a rear portion, where the body component is of substantial uniform thickness and forms a silhouette of a fish, the front portion comprises a forwardly extending tab, and the rear portion forms a tail; and
a head component configured to be affixed to the forwardly extending tab.

2. The fishing lure of claim 1, where the forwardly extending tab forms a fixing hole in an interior of the body component.

3. The fishing lure of claim 2, where the head component forms a bolt hole configured to align with the fixing hole of the body component when the head component is coupled to the body component.

4. The fishing lure of claim 1, further comprising a bolt configured to couple the body component and the head component.

5. The fishing lure of claim 3, further comprising a bolt inserted into the bolt hole of the head component and inserted through the fixing hole of the body component coupling the body component and the head component.

6. The fishing lure of claim 5, where:
the head component forms a slot to accept the forwardly extending tab, and
the bolt crosses the slot to secure the forwardly extending tab.

7. The fishing lure of claim 1, where the head component forms a rigging cavity across an entire length of the head component.

8. A fishing lure comprising:
a body characterized by a substantially uniform thickness forming a silhouette of a fish and a head end forming a fixing hole through the substantially uniform thickness of the body; and
a head having a rear side and an underside, the head forming:
a slot with a first opening on the rear side of the head couplable to the head end of the body; and
a fastener hole with a second opening on the underside of the head, the fastener hole extending through the slot.

9. The fishing lure of claim 8, where the fixing hole is configured to align with the fastener hole when the head end of the body is inserted into the slot of the head.

10. The fishing lure of claim 8, further comprising: a bolt configured to be inserted into the fastener hole of the head and through the slot of the head and the head end of the body securing the body to the head.

11. The fishing lure of claim 8,
where the fastener hole has a threaded portion with a first diameter and a non-threaded portion with a second diameter, and
the fishing lure further comprising a bolt, the bolt comprising a threaded shaft and a bolt head, the threaded shaft of the bolt inserted in the threaded portion of the fastener hole and through the slot of the head component and the fastener hole of the head end of the body securing the body to the head, and the bolt head is fit within the fastener hole adjacent to a shoulder formed at a junction of the threaded portion and the non-threaded portion of the fastener hole.

12. The fishing lure of claim 8, where the head comprises a front side opposite the rear side, the head forms a rigging cavity running from the front side to the rear side of the head.

13. The fishing lure of claim 8, where the head end of the body tapers to a bill comprising a curved terminus.

14. The fishing lure of claim 8, where the body forms two attachment holes at the head end, the fishing lure further comprising a weight coupled to the body at the two attachment holes.

15. The fishing lure of claim 8, where the head is characterized by a front face opposite the rear side, the front face forming a torpedo-like conical shape.

16. The fishing lure of claim 8, where the head is characterized by:
a front face opposite the rear side,
the underside connecting the front face and the rear side having an underside length,
a top side opposite the underside,
the top side connecting the front face and the rear side having a top-side length,
the front face forming an acute angle from the top side of the head to the underside, and
the top-side length being longer than the underside length.

17. A fishing lure comprising:
a flat body forming a silhouette of a fish having a head end of the flat body and a tail end of the flat body, the flat body characterized by a substantially uniform thickness of less than 0.5 inches and a length from the head end and the tail end of at least 15.5 inches, the flat body forming a tab and connecting hole at the head end; and
a head component having a rear side, a front face opposite the rear side, and an underside connecting the rear side and the front face, the head component forming:
a rigging passage having openings on the rear side and the front face,
a slot with a first opening on the rear side of the head component couplable to the head end of the flat body; and
a fastener hole with a second opening on the underside of the head component, the fastener hole extending through the slot.

18. The fishing lure of claim 17, where the front face comprises a symmetrical angled concave face.

19. The fishing lure of claim 17, further comprising:
a tailfin forming a lunate-shape with two lobes split by two retaining grooves on opposite sides of the tailfin, where the flat body forms a tail slot at the tail end opposite the head end of the flat body, the tail slot couplable to the two retaining grooves of the tailfin.

20. The fishing lure of claim 1, where the component body is formed from a single cut piece of a material of the substantial uniform thickness.

21. The fishing lure of claim 1, where the forwardly extending tab is rectangular shaped and configured to fit within a slot of the head component.

* * * * *